(12) United States Patent
Xu et al.

(10) Patent No.: US 9,605,508 B2
(45) Date of Patent: *Mar. 28, 2017

(54) DISINTEGRABLE AND CONFORMABLE METALLIC SEAL, AND METHOD OF MAKING THE SAME

(75) Inventors: Zhiyue Xu, Cypress, TX (US);
YingQing Xu, Tomball, TX (US);
Gregory Lee Hern, Porter, TX (US);
Bennett M. Richard, Kingwood, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 746 days.

This patent is subject to a terminal disclaimer.

(21) Appl. No.: 13/466,311

(22) Filed: May 8, 2012

(65) Prior Publication Data

US 2013/0300066 A1   Nov. 14, 2013

(51) Int. Cl.
*E21B 33/12* (2006.01)
*B22F 1/00* (2006.01)
(Continued)

(52) U.S. Cl.
CPC ............ *E21B 33/12* (2013.01); *B22F 1/0007* (2013.01); *B22F 5/106* (2013.01); *B22F 7/06* (2013.01); *C22C 1/0408* (2013.01); *C22C 1/10* (2013.01); *C22C 32/0036* (2013.01); *C22C 32/0047* (2013.01); *E21B 33/1208* (2013.01); *E21B 33/134* (2013.01); *B22F 1/0018* (2013.01);
(Continued)

(58) Field of Classification Search
None
See application file for complete search history.

(56) References Cited

U.S. PATENT DOCUMENTS 1,468,905 A   9/1923   Herman
2,189,697 A   2/1940   Baker
(Continued)

FOREIGN PATENT DOCUMENTS

CA   2783241 A1   6/2011
CA   2783346 A1   6/2011
(Continued)

OTHER PUBLICATIONS

Simulia Realistic Simulation News, [online]; [retrieved on Jan. 10, 2013]; retrieved from the internet http://www.3ds.com/fileadmin/brands/SIMULIA/Customer_Stories/Baker_Hughes/Energy_BakerHughes_RSN_Feb11.pdf, "Baker Hughes Refines Expandable Tubular Technology with Abaqus and Isight," Jan./Feb. 2011, 2p.
(Continued)

*Primary Examiner* — Adam Krupicka
(74) *Attorney, Agent, or Firm* — Cantor Colburn LLP

(57) ABSTRACT

A seal includes a metal composite that has a cellular nanomatrix that includes a metallic nanomatrix material, a metal matrix disposed in the cellular nanomatrix, and a disintegration agent; an inner sealing surface; and an outer sealing surface disposed radially from the inner sealing surface. The seal can be prepared by combining a metal matrix powder, a disintegration agent, and metal nanomatrix material to form a composition; compacting the composition to form a compacted composition; sintering the compacted composition; and pressing the sintered composition to form the seal.

32 Claims, 19 Drawing Sheets

(51) Int. Cl.

| | | |
|---|---|---|
| *E21B 33/134* | (2006.01) | |
| *B22F 7/06* | (2006.01) | |
| *C22C 1/04* | (2006.01) | |
| *C22C 1/10* | (2006.01) | |
| *C22C 32/00* | (2006.01) | |
| *B22F 5/10* | (2006.01) | |
| *C22C 33/02* | (2006.01) | |

(52) U.S. Cl.
CPC ............... *B22F 1/0059* (2013.01); *B22F 5/10* (2013.01); *B22F 2998/10* (2013.01); *C22C 1/0416* (2013.01); *C22C 1/0483* (2013.01); *C22C 33/02* (2013.01)

(56) References Cited

U.S. PATENT DOCUMENTS

| | | | |
|---|---|---|---|
| 2,222,233 | A | 11/1940 | Mize |
| 2,225,143 | A | 12/1940 | Baker et al. |
| 2,238,895 | A | 4/1941 | Gage |
| 2,261,292 | A | 11/1941 | Salnikov |
| 2,294,648 | A | 9/1942 | Ansel et al. |
| 2,301,624 | A | 11/1942 | Holt |
| 2,672,199 | A | 3/1948 | McKenna |
| 2,753,941 | A | 7/1956 | Hebard et al. |
| 2,754,910 | A | 7/1956 | Derrick et al. |
| 2,933,136 | A | 4/1960 | Ayers et al. |
| 2,983,634 | A | 5/1961 | Budininkas et al. |
| 3,057,405 | A | 10/1962 | Mallinger |
| 3,066,391 | A | 12/1962 | Vordahl |
| 3,106,959 | A | 10/1963 | Huitt et al. |
| 3,142,338 | A | 7/1964 | Brown |
| 3,152,009 | A | 10/1964 | Delong |
| 3,196,949 | A | 7/1965 | Thomas |
| 3,242,988 | A | 3/1966 | McGuire et al. |
| 3,316,748 | A | 5/1967 | Lang et al. |
| 3,326,291 | A | 6/1967 | Zandmer et al. |
| 3,347,317 | A | 10/1967 | Zandmer |
| 3,347,714 | A | 10/1967 | Broverman et al. |
| 3,390,724 | A | 7/1968 | Caldwell |
| 3,395,758 | A | 8/1968 | Kelly et al. |
| 3,406,101 | A | 10/1968 | Kilpatrick |
| 3,416,918 | A | 12/1968 | Henry |
| 3,434,537 | A | 3/1969 | Zandmer |
| 3,465,181 | A | 9/1969 | Colby et al. |
| 3,513,230 | A | 5/1970 | Rhees et al. |
| 3,602,305 | A | 8/1971 | Kisling |
| 3,637,446 | A | 1/1972 | Elliott et al. |
| 3,645,331 | A | 2/1972 | Maurer et al. |
| 3,660,049 | A | 5/1972 | Benjamin |
| 3,765,484 | A | 10/1973 | Hamby, Jr. et al. |
| 3,768,563 | A | 10/1973 | Blount |
| 3,775,823 | A | 12/1973 | Adolph et al. |
| 3,816,080 | A * | 6/1974 | Bomford ............. C22C 32/0036 148/437 |
| 3,878,889 | A | 4/1975 | Seabourn |
| 3,894,850 | A | 7/1975 | Kovalchuk et al. |
| 3,924,677 | A | 12/1975 | Prenner et al. |
| 4,010,583 | A | 3/1977 | Highberg |
| 4,039,717 | A | 8/1977 | Titus |
| 4,050,529 | A | 9/1977 | Tagirov et al. |
| 4,157,732 | A | 6/1979 | Fonner |
| 4,248,307 | A | 2/1981 | Silberman et al. |
| 4,284,137 | A | 8/1981 | Taylor |
| 4,292,377 | A | 9/1981 | Petersen et al. |
| 4,372,384 | A | 2/1983 | Kinney |
| 4,373,584 | A | 2/1983 | Silberman et al. |
| 4,373,952 | A | 2/1983 | Parent |
| 4,374,543 | A | 2/1983 | Richardson |
| 4,384,616 | A | 5/1983 | Dellinger |
| 4,395,440 | A | 7/1983 | Abe et al. |
| 4,399,871 | A | 8/1983 | Adkins et al. |
| 4,407,368 | A | 10/1983 | Erbstoesser |
| 4,422,508 | A | 12/1983 | Rutledge, Jr. et al. |
| 4,452,311 | A | 6/1984 | Speegle et al. |
| 4,475,729 | A | 10/1984 | Costigan |
| 4,498,543 | A | 2/1985 | Pye et al. |
| 4,499,048 | A | 2/1985 | Hanejko |
| 4,499,049 | A | 2/1985 | Hanejko |
| 4,524,825 | A | 6/1985 | Fore |
| 4,526,840 | A | 7/1985 | Jerabek |
| 4,534,414 | A | 8/1985 | Pringle |
| 4,539,175 | A | 9/1985 | Lichti et al. |
| 4,554,986 | A | 11/1985 | Jones |
| 4,619,699 | A * | 10/1986 | Petkovic-Luton ........ B22F 9/04 75/252 |
| 4,640,354 | A | 2/1987 | Boisson |
| 4,664,962 | A | 5/1987 | DesMarais, Jr. |
| 4,668,470 | A | 5/1987 | Gilman et al. |
| 4,673,549 | A | 6/1987 | Ecer |
| 4,674,572 | A | 6/1987 | Gallus |
| 4,678,037 | A | 7/1987 | Smith |
| 4,681,133 | A | 7/1987 | Weston |
| 4,688,641 | A | 8/1987 | Knieriemen |
| 4,690,796 | A * | 9/1987 | Paliwal ............... C22C 32/0073 264/7 |
| 4,693,863 | A | 9/1987 | Del Corso et al. |
| 4,703,807 | A | 11/1987 | Weston |
| 4,706,753 | A | 11/1987 | Ohkochi et al. |
| 4,708,202 | A | 11/1987 | Sukup et al. |
| 4,708,208 | A | 11/1987 | Halbardier |
| 4,709,761 | A | 12/1987 | Setterberg, Jr. |
| 4,714,116 | A | 12/1987 | Brunner |
| 4,716,964 | A | 1/1988 | Erbstoesser et al. |
| 4,719,971 | A | 1/1988 | Owens |
| 4,721,159 | A | 1/1988 | Ohkochi et al. |
| 4,738,599 | A | 4/1988 | Shilling |
| 4,741,973 | A | 5/1988 | Condit et al. |
| 4,768,588 | A | 9/1988 | Kupsa |
| 4,775,598 | A | 10/1988 | Jaeckel |
| 4,784,226 | A | 11/1988 | Wyatt |
| 4,805,699 | A | 2/1989 | Halbardier |
| 4,817,725 | A | 4/1989 | Jenkins |
| 4,834,184 | A | 5/1989 | Streich et al. |
| H635 | H | 6/1989 | Johnson et al. |
| 4,850,432 | A | 7/1989 | Porter et al. |
| 4,853,056 | A | 8/1989 | Hoffman |
| 4,869,324 | A | 9/1989 | Holder |
| 4,869,325 | A | 9/1989 | Halbardier |
| 4,880,059 | A | 11/1989 | Brandell et al. |
| 4,889,187 | A | 12/1989 | Terrell et al. |
| 4,890,675 | A | 1/1990 | Dew |
| 4,901,794 | A | 2/1990 | Baugh et al. |
| 4,909,320 | A | 3/1990 | Hebert et al. |
| 4,929,415 | A | 5/1990 | Okazaki |
| 4,932,474 | A | 6/1990 | Schroeder, Jr. et al. |
| 4,938,309 | A | 7/1990 | Emdy |
| 4,938,809 | A | 7/1990 | Das et al. |
| 4,944,351 | A | 7/1990 | Eriksen et al. |
| 4,949,788 | A | 8/1990 | Szarka et al. |
| 4,952,902 | A | 8/1990 | Kawaguchi et al. |
| 4,975,412 | A | 12/1990 | Okazaki et al. |
| 4,977,958 | A | 12/1990 | Miller |
| 4,981,177 | A | 1/1991 | Carmody et al. |
| 4,986,361 | A | 1/1991 | Mueller et al. |
| 4,997,622 | A | 3/1991 | Regazzoni et al. |
| 5,006,044 | A | 4/1991 | Walker, Sr. et al. |
| 5,010,955 | A | 4/1991 | Springer |
| 5,036,921 | A | 8/1991 | Pittard et al. |
| 5,048,611 | A | 9/1991 | Cochran |
| 5,049,165 | A | 9/1991 | Tselesin |
| 5,061,323 | A | 10/1991 | DeLuccia |
| 5,063,775 | A | 11/1991 | Walker, Sr. et al. |
| 5,073,207 | A | 12/1991 | Faure et al. |
| 5,074,361 | A | 12/1991 | Brisco et al. |
| 5,076,869 | A | 12/1991 | Bourell et al. |
| 5,084,088 | A | 1/1992 | Okazaki |
| 5,087,304 | A | 2/1992 | Chang et al. |
| 5,090,480 | A | 2/1992 | Pittard et al. |
| 5,095,988 | A | 3/1992 | Bode |
| 5,103,911 | A | 4/1992 | Heijnen |
| 5,117,915 | A | 6/1992 | Mueller et al. |
| 5,161,614 | A | 11/1992 | Wu et al. |
| 5,178,216 | A | 1/1993 | Giroux et al. |

(56) References Cited

U.S. PATENT DOCUMENTS

| | | |
|---|---|---|
| 5,181,571 A | 1/1993 | Mueller et al. |
| 5,188,182 A | 2/1993 | Echols, III et al. |
| 5,188,183 A | 2/1993 | Hopmann et al. |
| 5,204,055 A | 4/1993 | Sachs et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,252,365 A | 10/1993 | White |
| 5,253,714 A | 10/1993 | Davis et al. |
| 5,271,468 A | 12/1993 | Streich et al. |
| 5,282,509 A | 2/1994 | Schurr, III |
| 5,292,478 A | 3/1994 | Scorey |
| 5,293,940 A | 3/1994 | Hromas et al. |
| 5,304,260 A | 4/1994 | Aikawa et al. |
| 5,309,874 A | 5/1994 | Willermet et al. |
| 5,310,000 A | 5/1994 | Arterbury et al. |
| 5,316,598 A | 5/1994 | Chang et al. |
| 5,318,746 A | 6/1994 | Lashmore |
| 5,352,522 A | 10/1994 | Kugimiya et al. |
| 5,380,473 A | 1/1995 | Bogue et al. |
| 5,387,380 A | 2/1995 | Cima et al. |
| 5,392,860 A | 2/1995 | Ross |
| 5,394,941 A | 3/1995 | Venditto et al. |
| 5,398,754 A | 3/1995 | Dinhoble |
| 5,407,011 A | 4/1995 | Layton |
| 5,409,555 A | 4/1995 | Fujita et al. |
| 5,411,082 A | 5/1995 | Kennedy |
| 5,417,285 A | 5/1995 | Van Buskirk et al. |
| 5,425,424 A | 6/1995 | Reinhardt et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,456,317 A | 10/1995 | Hood, III et al. |
| 5,456,327 A | 10/1995 | Denton et al. |
| 5,464,062 A | 11/1995 | Blizzard, Jr. |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,479,986 A | 1/1996 | Gano et al. |
| 5,506,055 A | 4/1996 | Dorfman et al. |
| 5,507,439 A | 4/1996 | Story |
| 5,511,620 A | 4/1996 | Baugh et al. |
| 5,526,880 A | 6/1996 | Jordan, Jr. et al. |
| 5,526,881 A | 6/1996 | Martin et al. |
| 5,529,746 A | 6/1996 | Knoss et al. |
| 5,533,573 A | 7/1996 | Jordan, Jr. et al. |
| 5,536,485 A | 7/1996 | Kume et al. |
| 5,558,153 A | 9/1996 | Holcombe et al. |
| 5,601,924 A * | 2/1997 | Beane ............ B01J 2/006 252/510 |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,701,576 A | 12/1997 | Fujita et al. |
| 5,707,214 A | 1/1998 | Schmidt |
| 5,709,269 A | 1/1998 | Head |
| 5,720,344 A | 2/1998 | Newman |
| 5,728,195 A | 3/1998 | Eastman et al. |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,896,819 A | 4/1999 | Turila et al. |
| 5,902,424 A | 5/1999 | Fujita et al. |
| 5,934,372 A | 8/1999 | Muth |
| 5,941,309 A | 8/1999 | Appleton |
| 5,960,881 A | 10/1999 | Allamon et al. |
| 5,985,466 A | 11/1999 | Atarashi et al. |
| 5,988,287 A | 11/1999 | Jordan, Jr. et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 6,024,915 A | 2/2000 | Kume et al. |
| 6,032,735 A | 3/2000 | Echols |
| 6,036,777 A | 3/2000 | Sachs |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb |
| 6,167,970 B1 | 1/2001 | Stout et al. |
| 6,170,583 B1 | 1/2001 | Boyce |
| 6,173,779 B1 | 1/2001 | Smith |
| 6,176,323 B1 | 1/2001 | Weirich et al. |
| 6,189,616 B1 | 2/2001 | Gano et al. |
| 6,189,618 B1 | 2/2001 | Beeman et al. |
| 6,213,202 B1 | 4/2001 | Read, Jr. |
| 6,220,350 B1 | 4/2001 | Brothers et al. |
| 6,220,357 B1 | 4/2001 | Carmichael et al. |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,248,399 B1 | 6/2001 | Hehmann |
| 6,250,392 B1 | 6/2001 | Muth |
| 6,261,432 B1 | 7/2001 | Huber et al. |
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,341,747 B1 | 1/2002 | Schmidt et al. |
| 6,349,766 B1 | 2/2002 | Bussear et al. |
| 6,354,372 B1 | 3/2002 | Carisella et al. |
| 6,354,379 B2 | 3/2002 | Miszewski et al. |
| 6,357,332 B1 | 3/2002 | Vecchio |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,180 B1 | 5/2002 | Berscheidt et al. |
| 6,394,185 B1 | 5/2002 | Constien |
| 6,397,950 B1 | 6/2002 | Streich et al. |
| 6,401,547 B1 | 6/2002 | Hatfield et al. |
| 6,403,210 B1 | 6/2002 | Stuivinga et al. |
| 6,408,946 B1 | 6/2002 | Marshall et al. |
| 6,419,023 B1 | 7/2002 | George et al. |
| 6,439,313 B1 | 8/2002 | Thomeer et al. |
| 6,446,717 B1 | 9/2002 | White et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | Oneal et al. |
| 6,491,116 B2 | 12/2002 | Berscheidt et al. |
| 6,513,598 B2 | 2/2003 | Moore et al. |
| 6,513,600 B2 | 2/2003 | Ross |
| 6,540,033 B1 | 4/2003 | Sullivan et al. |

(56) References Cited

U.S. PATENT DOCUMENTS

| | | |
|---|---|---|
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,609,569 B2 | 8/2003 | Howlett et al. |
| 6,612,826 B1 | 9/2003 | Bauer et al. |
| 6,613,383 B1 | 9/2003 | George et al. |
| 6,619,400 B2 | 9/2003 | Brunet |
| 6,634,428 B2 | 10/2003 | Krauss et al. |
| 6,662,886 B2 | 12/2003 | Russell |
| 6,675,889 B1 | 1/2004 | Mullins et al. |
| 6,699,305 B2 | 3/2004 | Myrick |
| 6,712,153 B2 | 3/2004 | Turley et al. |
| 6,712,797 B1 | 3/2004 | Southern, Jr. |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,769,491 B2 | 8/2004 | Zimmerman et al. |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,899,777 B2 | 5/2005 | Vaidyanathan et al. |
| 6,908,516 B2 | 6/2005 | Hehmann et al. |
| 6,913,827 B2 | 7/2005 | George et al. |
| 6,926,086 B2 | 8/2005 | Patterson et al. |
| 6,932,159 B2 | 8/2005 | Hovem |
| 6,939,388 B2 | 9/2005 | Angeliu |
| 6,945,331 B2 | 9/2005 | Patel |
| 6,951,331 B2 | 10/2005 | Haughom et al. |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,013,998 B2 | 3/2006 | Ray et al. |
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,906 B2 | 8/2006 | Gardner |
| 7,108,080 B2 | 9/2006 | Tessari et al. |
| 7,111,682 B2 | 9/2006 | Blaisdell |
| 7,128,145 B2 | 10/2006 | Mickey |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,165,622 B2 | 1/2007 | Hirth et al. |
| 7,168,494 B2 | 1/2007 | Starr et al. |
| 7,174,963 B2 | 2/2007 | Bertelsen |
| 7,182,135 B2 | 2/2007 | Szarka |
| 7,188,559 B1 | 3/2007 | Vecchio |
| 7,210,527 B2 | 5/2007 | Walker et al. |
| 7,210,533 B2 | 5/2007 | Starr et al. |
| 7,217,311 B2 | 5/2007 | Hong et al. |
| 7,234,530 B2 | 6/2007 | Gass |
| 7,250,188 B2 | 7/2007 | Dodelet et al. |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,172 B2 | 9/2007 | Hofman |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,316,274 B2 | 1/2008 | Xu et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,350,582 B2 | 4/2008 | McKeachnie et al. |
| 7,353,879 B2 | 4/2008 | Todd et al. |
| 7,360,593 B2 | 4/2008 | Constien |
| 7,360,597 B2 | 4/2008 | Blaisdell |
| 7,363,970 B2 | 4/2008 | Corre et al. |
| 7,373,978 B2 | 5/2008 | Barry et al. |
| 7,384,443 B2 | 6/2008 | Mirchandani |
| 7,387,158 B2 | 6/2008 | Murray et al. |
| 7,387,165 B2 | 6/2008 | Lopez de Cardenas et al. |
| 7,392,841 B2 | 7/2008 | Murray et al. |
| 7,401,648 B2 | 7/2008 | Richard |
| 7,416,029 B2 | 8/2008 | Telfer et al. |
| 7,422,058 B2 | 9/2008 | O'Malley |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,509,993 B1 | 3/2009 | Turng et al. |
| 7,510,018 B2 | 3/2009 | Williamson et al. |
| 7,513,311 B2 | 4/2009 | Gramstad et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,559,357 B2 | 7/2009 | Clem |
| 7,575,062 B2 | 8/2009 | East, Jr. |
| 7,579,087 B2 | 8/2009 | Maloney et al. |
| 7,591,318 B2 | 9/2009 | Tilghman |
| 7,600,572 B2 | 10/2009 | Slup et al. |
| 7,604,049 B2 | 10/2009 | Vaidya et al. |
| 7,604,055 B2 | 10/2009 | Richard et al. |
| 7,607,476 B2 | 10/2009 | Tom et al. |
| 7,617,871 B2 | 11/2009 | Surjaatmadja et al. |
| 7,635,023 B2 | 12/2009 | Goldberg et al. |
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,510 B2 | 4/2010 | Xu |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,735,578 B2 | 6/2010 | Loehr et al. |
| 7,743,836 B2 | 6/2010 | Cook et al. |
| 7,752,971 B2 | 7/2010 | Loehr |
| 7,757,773 B2 | 7/2010 | Rytlewski |

(56) References Cited

U.S. PATENT DOCUMENTS

| | | |
|---|---|---|
| 7,762,342 B2 | 7/2010 | Richard et al. |
| 7,770,652 B2 | 8/2010 | Barnett |
| 7,775,284 B2 | 8/2010 | Richards et al. |
| 7,775,285 B2 | 8/2010 | Surjaatmadja et al. |
| 7,775,286 B2 | 8/2010 | Duphorne |
| 7,784,543 B2 | 8/2010 | Johnson |
| 7,793,714 B2 | 9/2010 | Johnson |
| 7,798,225 B2 | 9/2010 | Giroux et al. |
| 7,798,226 B2 | 9/2010 | Themig |
| 7,798,236 B2 | 9/2010 | McKeachnie et al. |
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhead et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,855,168 B2 | 12/2010 | Fuller et al. |
| 7,861,779 B2 | 1/2011 | Vestavik |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,909,115 B2 | 3/2011 | Grove et al. |
| 7,913,765 B2 | 3/2011 | Crow et al. |
| 7,918,275 B2 | 4/2011 | Clem |
| 7,931,093 B2 | 4/2011 | Foster et al. |
| 7,938,191 B2 | 5/2011 | Vaidya |
| 7,946,335 B2 | 5/2011 | Bewlay et al. |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 7,992,763 B2 | 8/2011 | Vecchio et al. |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,127,856 B1 | 3/2012 | Nish et al. |
| 8,153,052 B2 | 4/2012 | Jackson et al. |
| 8,163,060 B2 | 4/2012 | Imanishi et al. |
| 8,211,247 B2 | 7/2012 | Marya et al. |
| 8,211,248 B2 | 7/2012 | Marya |
| 8,226,740 B2 | 7/2012 | Chaumonnot et al. |
| 8,230,731 B2 | 7/2012 | Dyer et al. |
| 8,231,947 B2 | 7/2012 | Vaidya et al. |
| 8,276,670 B2 | 10/2012 | Patel |
| 8,277,974 B2 | 10/2012 | Kumar et al. |
| 8,297,364 B2 | 10/2012 | Agrawal et al. |
| 8,327,931 B2 | 12/2012 | Agrawal et al. |
| 8,403,037 B2 | 3/2013 | Agrawal et al. |
| 8,425,651 B2 | 4/2013 | Xu et al. |
| 8,459,347 B2 | 6/2013 | Stout |
| 8,490,689 B1 | 7/2013 | McClinton et al. |
| 8,535,604 B1 | 9/2013 | Baker et al. |
| 8,573,295 B2 | 11/2013 | Johnson et al. |
| 9,260,935 B2 | 2/2016 | Murphree et al. |
| 2001/0040180 A1 | 11/2001 | Wittebrood et al. |
| 2001/0045285 A1 | 11/2001 | Russell |
| 2001/0045288 A1 | 11/2001 | Allamon et al. |
| 2002/0000319 A1 | 1/2002 | Brunet |
| 2002/0007948 A1 | 1/2002 | Bayne et al. |
| 2002/0014268 A1 | 2/2002 | Vann |
| 2002/0020527 A1 | 2/2002 | Kilaas et al. |
| 2002/0066572 A1 | 6/2002 | Muth |
| 2002/0092654 A1 | 7/2002 | Coronado et al. |
| 2002/0096365 A1 | 7/2002 | Berscheidt et al. |
| 2002/0104616 A1 | 8/2002 | De et al. |
| 2002/0108756 A1 | 8/2002 | Harrall et al. |
| 2002/0136904 A1 | 9/2002 | Glass et al. |
| 2002/0139541 A1 | 10/2002 | Sheffield et al. |
| 2002/0162661 A1 | 11/2002 | Krauss et al. |
| 2003/0019639 A1 | 1/2003 | Mackay |
| 2003/0037925 A1 | 2/2003 | Walker et al. |
| 2003/0060374 A1 | 3/2003 | Cooke, Jr. |
| 2003/0075326 A1 | 4/2003 | Ebinger |
| 2003/0104147 A1 | 6/2003 | Bretschneider et al. |
| 2003/0111728 A1 | 6/2003 | Thai et al. |
| 2003/0127013 A1 | 7/2003 | Zavitsanos et al. |
| 2003/0141060 A1 | 7/2003 | Hailey et al. |
| 2003/0141061 A1 | 7/2003 | Hailey et al. |
| 2003/0141079 A1 | 7/2003 | Doane et al. |
| 2003/0150614 A1 | 8/2003 | Brown et al. |
| 2003/0155114 A1 | 8/2003 | Pedersen et al. |
| 2003/0155115 A1 | 8/2003 | Pedersen et al. |
| 2003/0159828 A1 | 8/2003 | Howard et al. |
| 2003/0164237 A1 | 9/2003 | Butterfield |
| 2003/0183391 A1 | 10/2003 | Hriscu et al. |
| 2003/0226668 A1 | 12/2003 | Zimmerman et al. |
| 2004/0005483 A1 | 1/2004 | Lin |
| 2004/0020832 A1 | 2/2004 | Richards et al. |
| 2004/0031605 A1 | 2/2004 | Mickey |
| 2004/0045723 A1 | 3/2004 | Slup et al. |
| 2004/0055758 A1 | 3/2004 | Brezinski et al. |
| 2004/0069502 A1* | 4/2004 | Luke ............... E21B 33/1208 166/387 |
| 2004/0089449 A1 | 5/2004 | Walton et al. |
| 2004/0154806 A1 | 8/2004 | Bode et al. |
| 2004/0159428 A1 | 8/2004 | Hammond et al. |
| 2004/0159446 A1 | 8/2004 | Haugen et al. |
| 2004/0182583 A1 | 9/2004 | Doane et al. |
| 2004/0216868 A1 | 11/2004 | Owen, Sr. |
| 2004/0231845 A1 | 11/2004 | Cooke, Jr. |
| 2004/0251025 A1 | 12/2004 | Giroux et al. |
| 2004/0256109 A1 | 12/2004 | Johnson |
| 2004/0256157 A1 | 12/2004 | Tessari et al. |
| 2004/0261993 A1 | 12/2004 | Nguyen |
| 2004/0261994 A1 | 12/2004 | Nguyen et al. |
| 2005/0034876 A1 | 2/2005 | Doane et al. |
| 2005/0051329 A1 | 3/2005 | Blaisdell |
| 2005/0064247 A1 | 3/2005 | Sane et al. |
| 2005/0069449 A1 | 3/2005 | Jackson et al. |
| 2005/0074612 A1 | 4/2005 | Eklund et al. |
| 2005/0098313 A1 | 5/2005 | Atkins et al. |
| 2005/0102255 A1 | 5/2005 | Bultman |
| 2005/0106316 A1 | 5/2005 | Rigney et al. |
| 2005/0126334 A1 | 6/2005 | Mirchandani |
| 2005/0161212 A1 | 7/2005 | Leismer et al. |
| 2005/0161224 A1 | 7/2005 | Starr et al. |
| 2005/0165149 A1 | 7/2005 | Chanak et al. |
| 2005/0194143 A1 | 9/2005 | Xu et al. |
| 2005/0205264 A1 | 9/2005 | Starr et al. |
| 2005/0205265 A1 | 9/2005 | Todd et al. |
| 2005/0205266 A1 | 9/2005 | Todd et al. |
| 2005/0235757 A1 | 10/2005 | De Jonge et al. |
| 2005/0241824 A1 | 11/2005 | Burris, II et al. |
| 2005/0241825 A1 | 11/2005 | Burris, II et al. |
| 2005/0257936 A1 | 11/2005 | Lehr |
| 2005/0268746 A1 | 12/2005 | Abkowitz et al. |
| 2005/0275143 A1 | 12/2005 | Toth |
| 2005/0279501 A1 | 12/2005 | Surjaatmadja et al. |
| 2006/0012087 A1 | 1/2006 | Matsuda et al. |
| 2006/0045787 A1 | 3/2006 | Jandeska et al. |
| 2006/0057479 A1 | 3/2006 | Niimi et al. |
| 2006/0081378 A1 | 4/2006 | Howard et al. |
| 2006/0102871 A1 | 5/2006 | Wang |
| 2006/0108114 A1 | 5/2006 | Johnson |
| 2006/0108126 A1 | 5/2006 | Horn et al. |
| 2006/0110615 A1 | 5/2006 | Karim et al. |

(56) References Cited

U.S. PATENT DOCUMENTS

| | | |
|---|---|---|
| 2006/0116696 A1 | 6/2006 | Odermatt et al. |
| 2006/0124310 A1 | 6/2006 | Lopez de Cardenas et al. |
| 2006/0124312 A1 | 6/2006 | Rytlewski et al. |
| 2006/0131011 A1 | 6/2006 | Lynde et al. |
| 2006/0131031 A1 | 6/2006 | McKeachnie et al. |
| 2006/0131081 A1 | 6/2006 | Mirchandani et al. |
| 2006/0144515 A1 | 7/2006 | Tada et al. |
| 2006/0150770 A1 | 7/2006 | Freim |
| 2006/0151178 A1 | 7/2006 | Howard et al. |
| 2006/0153728 A1 | 7/2006 | Schoenung et al. |
| 2006/0162927 A1 | 7/2006 | Walker et al. |
| 2006/0169453 A1 | 8/2006 | Savery et al. |
| 2006/0186602 A1 | 8/2006 | Martin et al. |
| 2006/0207763 A1 | 9/2006 | Hofman et al. |
| 2006/0213670 A1 | 9/2006 | Bishop et al. |
| 2006/0231253 A1 | 10/2006 | Vilela et al. |
| 2006/0283592 A1 | 12/2006 | Sierra et al. |
| 2007/0017674 A1 | 1/2007 | Blaisdell |
| 2007/0017675 A1 | 1/2007 | Hammami |
| 2007/0029082 A1 | 2/2007 | Giroux et al. |
| 2007/0039161 A1 | 2/2007 | Garcia |
| 2007/0039741 A1 | 2/2007 | Hailey |
| 2007/0044958 A1 | 3/2007 | Rytlewski et al. |
| 2007/0044966 A1 | 3/2007 | Davies et al. |
| 2007/0051521 A1 | 3/2007 | Fike et al. |
| 2007/0053785 A1 | 3/2007 | Hetz et al. |
| 2007/0054101 A1 | 3/2007 | Sigalas et al. |
| 2007/0057415 A1 | 3/2007 | Katagiri et al. |
| 2007/0062644 A1 | 3/2007 | Nakamura et al. |
| 2007/0074601 A1 | 4/2007 | Hong et al. |
| 2007/0074873 A1 | 4/2007 | McKeachnie et al. |
| 2007/0102199 A1 | 5/2007 | Smith et al. |
| 2007/0107899 A1 | 5/2007 | Werner et al. |
| 2007/0107908 A1 | 5/2007 | Vaidya et al. |
| 2007/0108060 A1 | 5/2007 | Park |
| 2007/0119600 A1 | 5/2007 | Slup et al. |
| 2007/0131912 A1 | 6/2007 | Simone et al. |
| 2007/0151009 A1 | 7/2007 | Conrad, III et al. |
| 2007/0151769 A1 | 7/2007 | Slutz et al. |
| 2007/0169935 A1 | 7/2007 | Akbar et al. |
| 2007/0181224 A1 | 8/2007 | Marya et al. |
| 2007/0185655 A1 | 8/2007 | Le Bemadjiel |
| 2007/0187095 A1 | 8/2007 | Walker et al. |
| 2007/0207182 A1 | 9/2007 | Weber et al. |
| 2007/0221373 A1 | 9/2007 | Murray |
| 2007/0221384 A1 | 9/2007 | Murray |
| 2007/0227745 A1 | 10/2007 | Roberts et al. |
| 2007/0259994 A1 | 11/2007 | Tour et al. |
| 2007/0261862 A1 | 11/2007 | Murray |
| 2007/0272411 A1 | 11/2007 | Lopez De Cardenas et al. |
| 2007/0272413 A1 | 11/2007 | Rytlewski et al. |
| 2007/0277979 A1 | 12/2007 | Todd et al. |
| 2007/0284109 A1 | 12/2007 | East et al. |
| 2007/0284112 A1 | 12/2007 | Magne et al. |
| 2007/0299510 A1 | 12/2007 | Venkatraman et al. |
| 2008/0020923 A1 | 1/2008 | Debe et al. |
| 2008/0047707 A1 | 2/2008 | Boney et al. |
| 2008/0060810 A9 | 3/2008 | Nguyen et al. |
| 2008/0066923 A1 | 3/2008 | Xu |
| 2008/0066924 A1 | 3/2008 | Xu |
| 2008/0072705 A1 | 3/2008 | Chaumonnot et al. |
| 2008/0078553 A1 | 4/2008 | George |
| 2008/0081866 A1 | 4/2008 | Gong et al. |
| 2008/0093073 A1 | 4/2008 | Bustos et al. |
| 2008/0099209 A1 | 5/2008 | Loretz et al. |
| 2008/0105438 A1 | 5/2008 | Jordan et al. |
| 2008/0115932 A1 | 5/2008 | Cooke |
| 2008/0121390 A1 | 5/2008 | O'Malley et al. |
| 2008/0121436 A1 | 5/2008 | Slay et al. |
| 2008/0127475 A1 | 6/2008 | Griffo |
| 2008/0135249 A1 | 6/2008 | Fripp et al. |
| 2008/0149325 A1 | 6/2008 | Crawford |
| 2008/0149345 A1 | 6/2008 | Marya et al. |
| 2008/0149351 A1 | 6/2008 | Marya et al. |
| 2008/0169105 A1 | 7/2008 | Williamson et al. |
| 2008/0169130 A1 | 7/2008 | Norman et al. |
| 2008/0179060 A1 | 7/2008 | Surjaatmadja et al. |
| 2008/0179104 A1 | 7/2008 | Zhang et al. |
| 2008/0196801 A1 | 8/2008 | Zhao et al. |
| 2008/0202764 A1 | 8/2008 | Clayton et al. |
| 2008/0202814 A1 | 8/2008 | Lyons et al. |
| 2008/0210473 A1 | 9/2008 | Zhang et al. |
| 2008/0216383 A1 | 9/2008 | Pierick et al. |
| 2008/0223586 A1 | 9/2008 | Barnett |
| 2008/0223587 A1 | 9/2008 | Cherewyk |
| 2008/0236829 A1 | 10/2008 | Lynde |
| 2008/0236842 A1 | 10/2008 | Bhavsar et al. |
| 2008/0248205 A1 | 10/2008 | Blanchet et al. |
| 2008/0277109 A1 | 11/2008 | Vaidya |
| 2008/0277980 A1 | 11/2008 | Koda et al. |
| 2008/0282924 A1 | 11/2008 | Saenger et al. |
| 2008/0296024 A1 | 12/2008 | Huang et al. |
| 2008/0302538 A1 | 12/2008 | Hofman |
| 2008/0314581 A1 | 12/2008 | Brown |
| 2008/0314588 A1 | 12/2008 | Langlais et al. |
| 2009/0038858 A1 | 2/2009 | Griffo et al. |
| 2009/0044946 A1 | 2/2009 | Schasteen et al. |
| 2009/0044949 A1 | 2/2009 | King et al. |
| 2009/0050334 A1 | 2/2009 | Marya et al. |
| 2009/0056934 A1 | 3/2009 | Xu |
| 2009/0065216 A1 | 3/2009 | Frazier |
| 2013/0024203 A1 | 3/2009 | Frazier |
| 2009/0084553 A1 | 4/2009 | Rytlewski et al. |
| 2009/0084556 A1 | 4/2009 | Richards et al. |
| 2009/0084600 A1 | 4/2009 | Severance |
| 2009/0090440 A1 | 4/2009 | Kellett et al. |
| 2009/0107684 A1 | 4/2009 | Cooke, Jr. |
| 2009/0114381 A1 | 5/2009 | Stroobants |
| 2009/0114382 A1 | 5/2009 | Grove et al. |
| 2009/0126436 A1 | 5/2009 | Fly et al. |
| 2009/0139720 A1 | 6/2009 | Frazier |
| 2009/0145666 A1 | 6/2009 | Radford et al. |
| 2009/0151949 A1 | 6/2009 | Marya et al. |
| 2009/0152009 A1 | 6/2009 | Slay et al. |
| 2009/0155616 A1 | 6/2009 | Thamida et al. |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0211770 A1 | 8/2009 | Nutley et al. |
| 2009/0226340 A1 | 9/2009 | Marya |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard et al. |
| 2009/0260817 A1 | 10/2009 | Gambier et al. |
| 2009/0266548 A1 | 10/2009 | Olsen et al. |
| 2009/0272544 A1 | 11/2009 | Giroux et al. |
| 2009/0283270 A1 | 11/2009 | Langeslag |
| 2009/0293672 A1 | 12/2009 | Mirchandani et al. |
| 2009/0301730 A1 | 12/2009 | Gweily |
| 2009/0305131 A1 | 12/2009 | Kumar et al. |
| 2009/0308588 A1 | 12/2009 | Howell et al. |
| 2009/0317556 A1 | 12/2009 | Macary |
| 2009/0317622 A1 | 12/2009 | Huang et al. |
| 2010/0003536 A1 | 1/2010 | Smith et al. |
| 2010/0012385 A1 | 1/2010 | Drivdahl et al. |
| 2010/0015002 A1 | 1/2010 | Barrera et al. |
| 2010/0015469 A1 | 1/2010 | Romanowski et al. |
| 2010/0025255 A1 | 2/2010 | Su et al. |
| 2010/0032151 A1 | 2/2010 | Duphorne et al. |
| 2010/0034857 A1 | 2/2010 | Launag et al. |
| 2010/0038076 A1 | 2/2010 | Spray et al. |
| 2010/0040180 A1 | 2/2010 | Kim et al. |
| 2010/0044041 A1 | 2/2010 | Smith et al. |
| 2010/0051278 A1 | 3/2010 | Mytopher et al. |
| 2010/0055491 A1 | 3/2010 | Vecchio et al. |
| 2010/0055492 A1 | 3/2010 | Barsoum et al. |
| 2010/0089583 A1 | 4/2010 | Xu et al. |
| 2010/0089587 A1 | 4/2010 | Stout |
| 2010/0101803 A1 | 4/2010 | Clayton et al. |

(56) References Cited

U.S. PATENT DOCUMENTS

| | | |
|---|---|---|
| 2010/0116495 A1 | 5/2010 | Spray |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |
| 2010/0270031 A1 | 10/2010 | Patel |
| 2010/0276136 A1 | 11/2010 | Evans et al. |
| 2010/0276159 A1 | 11/2010 | Mailand et al. |
| 2010/0282338 A1 | 11/2010 | Gerrard et al. |
| 2010/0282469 A1 | 11/2010 | Richard et al. |
| 2010/0294510 A1 | 11/2010 | Holmes |
| 2010/0297432 A1 | 11/2010 | Sherman et al. |
| 2010/0314105 A1 | 12/2010 | Rose |
| 2010/0314126 A1 | 12/2010 | Kellner |
| 2010/0319870 A1 | 12/2010 | Bewlay et al. |
| 2010/0326650 A1 | 12/2010 | Tran et al. |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0056692 A1 | 3/2011 | Lopez De Cardenas et al. |
| 2011/0056702 A1 | 3/2011 | Sharma et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0094406 A1 | 4/2011 | Marya et al. |
| 2011/0100643 A1 | 5/2011 | Themig et al. |
| 2011/0127044 A1 | 6/2011 | Radford et al. |
| 2011/0132143 A1* | 6/2011 | Xu et al. .................. 75/232 |
| 2011/0132612 A1 | 6/2011 | Agrawal et al. |
| 2011/0132619 A1 | 6/2011 | Agrawal et al. |
| 2011/0132620 A1 | 6/2011 | Agrawal et al. |
| 2011/0132621 A1 | 6/2011 | Agrawal et al. |
| 2011/0135530 A1 | 6/2011 | Xu et al. |
| 2011/0135805 A1 | 6/2011 | Doucet et al. |
| 2011/0135953 A1 | 6/2011 | Xu et al. |
| 2011/0136707 A1 | 6/2011 | Xu et al. |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton |
| 2011/0247833 A1 | 10/2011 | Todd et al. |
| 2011/0253387 A1 | 10/2011 | Ervin |
| 2011/0256356 A1 | 10/2011 | Tomantschger et al. |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen et al. |
| 2011/0284243 A1 | 11/2011 | Frazier |
| 2011/0300403 A1 | 12/2011 | Vecchio et al. |
| 2011/0314881 A1 | 12/2011 | Hatcher et al. |
| 2012/0067426 A1 | 3/2012 | Soni et al. |
| 2012/0090839 A1 | 4/2012 | Rudic |
| 2012/0103135 A1 | 5/2012 | Xu et al. |
| 2012/0107590 A1 | 5/2012 | Xu et al. |
| 2012/0118583 A1 | 5/2012 | Johnson et al. |
| 2012/0130470 A1 | 5/2012 | Agnew |
| 2012/0145378 A1 | 6/2012 | Frazier et al. |
| 2012/0168152 A1 | 7/2012 | Casciaro et al. |
| 2012/0205120 A1 | 8/2012 | Howell |
| 2012/0205872 A1 | 8/2012 | Reinhardt et al. |
| 2012/0211239 A1 | 8/2012 | Kritzler et al. |
| 2012/0234546 A1 | 9/2012 | Xu et al. |
| 2012/0234547 A1 | 9/2012 | O'Malley et al. |
| 2012/0267101 A1 | 10/2012 | Cooke |
| 2012/0292053 A1 | 11/2012 | Xu et al. |
| 2012/0318513 A1 | 12/2012 | Mazyar et al. |
| 2013/0004847 A1 | 1/2013 | Kumar et al. |
| 2013/0008671 A1 | 1/2013 | Booth |
| 2013/0025409 A1 | 1/2013 | Xu |
| 2013/0029886 A1 | 1/2013 | Mazyar et al. |
| 2013/0032357 A1 | 2/2013 | Mazyar et al. |
| 2013/0048304 A1 | 2/2013 | Agrawal et al. |
| 2013/0048305 A1 | 2/2013 | Xu et al. |
| 2013/0052472 A1 | 2/2013 | Xu |
| 2013/0081814 A1 | 4/2013 | Gaudette et al. |
| 2013/0084643 A1 | 4/2013 | Commarieu et al. |
| 2013/0105159 A1 | 5/2013 | Alvarez |
| 2013/0126190 A1 | 5/2013 | Mazyar et al. |
| 2013/0133897 A1 | 5/2013 | Baihly et al. |
| 2013/0146144 A1 | 6/2013 | Joseph et al. |
| 2013/0146302 A1 | 6/2013 | Gaudette et al. |
| 2013/0168257 A1 | 7/2013 | Mazyar et al. |
| 2013/0186626 A1 | 7/2013 | Aitken et al. |
| 2013/0240200 A1 | 9/2013 | Frazier |
| 2013/0299185 A1 | 11/2013 | Xu et al. |
| 2013/0299192 A1 | 11/2013 | Xu et al. |
| 2013/0300066 A1 | 11/2013 | Xu et al. |
| 2013/0319668 A1 | 12/2013 | Tschetter et al. |
| 2013/0327540 A1 | 12/2013 | Hamid et al. |
| 2014/0027128 A1 | 1/2014 | Johnson et al. |
| 2014/0060834 A1 | 3/2014 | Quintero et al. |
| 2014/0116711 A1 | 5/2014 | Tang |
| 2014/0262327 A1 | 9/2014 | Xu et al. |
| 2014/0360728 A1 | 12/2014 | Tashiro et al. |
| 2015/0060085 A1 | 3/2015 | Xu |
| 2015/0065401 A1 | 3/2015 | Xu et al. |

FOREIGN PATENT DOCUMENTS

| | | |
|---|---|---|
| CN | 1076968 A | 10/1993 |
| CN | 1255879 A | 6/2000 |
| CN | 1882759 A1 | 12/2006 |
| CN | 101050417 A | 10/2007 |
| CN | 101351523 A | 1/2009 |
| CN | 101457321 A | 6/2009 |
| EP | 0033625 A1 | 8/1981 |
| EP | 1174385 A2 | 1/2002 |
| EP | 1412175 A1 | 4/2004 |
| EP | 1798301 A1 | 8/2006 |
| EP | 1857570 A2 | 11/2007 |
| FR | 2782096 A1 | 2/2000 |
| GB | 912956 | 12/1962 |
| GB | 1046330 A | 10/1966 |
| GB | 1280833 A | 7/1972 |
| GB | 1357065 A | 6/1974 |
| JP | 61067770 | 4/1986 |
| JP | 754008 A | 2/1995 |
| JP | 8232029 A | 9/1996 |
| JP | 2000185725 A1 | 7/2000 |
| JP | 2002053902 A | 2/2002 |
| JP | 2004225084 A | 8/2004 |
| JP | 2004225765 A | 8/2004 |
| JP | 2005076052 A | 3/2005 |
| JP | 2010502840 A | 1/2010 |
| KR | 950014350 B1 | 11/1995 |
| WO | 9909227 A1 | 2/1999 |
| WO | 9947726 | 9/1999 |
| WO | 2004001087 A1 | 12/2003 |
| WO | 2005040068 A | 5/2005 |
| WO | 2007044635 A | 4/2007 |
| WO | 2007095376 A2 | 8/2007 |
| WO | 2008057045 A1 | 5/2008 |
| WO | 2008079485 A2 | 7/2008 |
| WO | 2008079777 A3 | 7/2008 |
| WO | 2009079745 A1 | 7/2009 |
| WO | 2010012184 A1 | 2/2010 |
| WO | 2011071902 A2 | 6/2011 |
| WO | 2011071907 A2 | 6/2011 |
| WO | 2011071910 A2 | 6/2011 |
| WO | 2011071910 A3 | 6/2011 |
| WO | 2011130063 A3 | 2/2012 |
| WO | 2012015567 A2 | 2/2012 |
| WO | 2012149007 A2 | 11/2012 |
| WO | 2012174101 A2 | 12/2012 |

(56) References Cited

FOREIGN PATENT DOCUMENTS

| WO | 2013053057 A1 | 4/2013 |
|----|---------------|--------|
| WO | 2013078031 A1 | 5/2013 |

OTHER PUBLICATIONS

Garry Garfield, "Formation Damage Control Utilizing Composite-Bridge-Plug Technology for Monobore, Multizone Stimulation Operations," SPE 70004, Copyright 2001, Society of Petroleum Engineers Inc., This paper was prepared for presentation at the SPE Permian Basin Oil and Gas Recovery Conference held in Midland, Texas, May 15-16, 2001, pp. 1-8.
International Search Report for related PCT Application No. PCT/US2013/035258, dated Jul. 4, 2013, pp. 1-4.
International Search Report for related PCT Application No. PCT/US2013/035261, dated Jul. 10, 2013, pp. 1-4.
International Search Report for related PCT Application No. PCT/US2013/035262, dated Jul. 1, 2013, pp. 1-4.
International Search Report for related PCT Application No. PCT/US2013/068062, dated Feb. 12, 2014, pp. 1-3.
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 Pages.
International Preliminary Report on Patentability; PCT/US2013/050475; Mailed Feb. 26, 2015; 10 Pages.
M.T. Triolo et al., "Resolving the Completion Engineer's Dilemma: Permanent or Retrievable Packer?"; Society of Petroleum Engineers, SPE Paper No. 76711; May 20, 2002; 16 pages.
Martin P. Coronado, "Development of an Internal Coiled Tubing Connector Utilizing Permanent Packer Technology"; Society of Petroleum Engineers, SPE Paper No. 46036; Apr. 15, 1998; 10 pages.
Notification of Transmittal of the International Preliminary Report on Patentability and the Written Opinion of the International Searching Authority, or the Declaration; PCT/US2013/020046; Jul. 29, 2014, 5 pages.
Notification of Transmittal of the International Search Report and the Written Opinion of the International Searching Authority, or the Declaration; PCT/US2014/010862; Apr. 21, 2014; 9 pages.
Notification of Transmittal of the International Search Report on Patentability and the Written Opinion of the International Searching Authority, or the Declaration; PCT/US2013/020046; Apr. 10, 2013, 7 pages.
Quik Drill Composite Frac Plug; Baker Hughes, Baker Oil Tools; Copyright 2002; 3 pages.
Kuzumaki, et al.; "Mechanical Characteristics and Preparation of Carbon Nanotube Fiber-Reinforced Ti Composite", Advanced Engineering Materials, 2000, 2, No. 7.
Lee, et al., "Effects of Ni addition on hydrogen storage properties of Mg17AL12 alloy", Materials Chemistry and Physics, 2011, 126, pp. 319-324.
Li, et al., "Investigation of aluminium-based nancompsoites with ultra-high strength", Materials Science and Engineering A, 527, pp. 305-316, (2009).
Liu, et al., "Calculated Phase Diagrams and the Corrosion of Die-Cast Mg—Al Alloys", Corrosion Science, 2009, 51, 606-619.
Liu, et al.; "Electroless Nickel Plating on AZ91 Mg Alloy Substrate"; Surface & Coatings Technology; 200; pp. 5087-5093; (2006).
Lunder et al.; "The Role of Mg17Al12 Phase in the Corrosion of Mg Alloy AZ91"; Corrosion; 45(9); pp. 741-748; (1989).
Majumdar, et al., "Laser Surface Engineering of a Magnesium Alloy with Al + Al2O3", Surface and Coatings Technology 179 (2004) pp. 297-305.
Mathis, "Sand Management: A Review of Approaches and Concerns", Society of Petroleum Engineers, SPE Paper No. 82240, SPE European Formation Damage Conference, The Hague, The Netherlands, May 13-14, 2003.

Murray, "Binary Alloy Phase Diagrams" Int. Met. Rev., 30(5) 1985 vol. 1, pp. 103-187.
Nie, "Patents of Methods to Prepare Intermetallic Matrix Composites: A Review", Recent Patents on Materials Science 2008, vol. 1, pp. 232-240.
Pardo, et al.; "Corrosion Behaviour of Magnesium/Aluminium Alloys in 3.5 wt% NaCl"; Corrosion Science; 50; pp. 823-834; (2008).
Rose, et al.; "The application of the polyaromatic sulfonates as tracers in geothermal reservoirs", Geothermics 30 (2001) pp. 617-640.
Shaw, "Benefits and Application of a Surface-Controlled Sliding Sleeve for Fracturing Operations"; Society of Petroleum Engineers, SPE Paper No. 147546; Oct. 30, 2011; 8 pages.
Shi, et al.; "Influence of the Beta Phase on the Corrosion Performance of Anodised Coatings on Magnesium-Aluminium Alloys"; Corrosion Science; 47; pp. 2760-2777; (2005).
Shimizu, et al., "Multi-walled carbon nanotube-reinforced magnesium alloy composites", Scripta Materialia, vol. 58, Issue 4, Feb. 2008, pp. 267-270.
Shumbera, et al. "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003.
Singh, et al., "Extended Homogeneity Range of Intermetallic Phases in Mechanically Alloyed Mg—Al Alloys", Elsevier Sciences Ltd., Intemetallics 11, 2003, pp. 373-376.
Song, "Recent Progress in Corrosion and Protection of Magnesium Alloys"; Advanced Engineering Materials; 7(7); pp. 563-586; (2005).
Song, et al.; "A Possible Biodegradable Magnesium Implant Material," Advanced Engineering Materials, vol. 9, Issue 4, Apr. 2007, pp. 298-302.
Song, et al.; "Corrosion Behaviour of AZ21, AZ501 and AZ91 in Sodium Chloride"; Corrosion Science; 40(10); pp. 1769-1791; (1998).
Song, et al.; "Corrosion Mechanisms of Magnesium Alloys"; Advanced Engineering Materials; 1(1); pp. 11-33; (1999).
Song, et al.; "Influence of Microstructure on the Corrosion of Diecast AZ91D"; Corrosion Science; 41; pp. 249-273; (1999).
Song, et al.; "Understanding Magnesium Corrosion"; Advanced Engineering Materials; 5; No. 12; pp. 837-858; (2003).
Sun, et al.; "Colloidal Processing of Carbon Nanotube/Alumina Composites" Chem. Mater. 2002, 14, pp. 5169-5172.
Vernon Constien et al., "Development of Reactive Coatings to Protect Sand-Control Screens", SPE 112494, Copyright 2008, Society of Petroleum Engineers, This paper was prepared for presentation at the 2008 SPE International Symposium and Exhibition on For.
Vickery, et al.; "New One-Trip Multi-Zone Frac Pack System with Positive Positioning." European Petroleum Conference, Oct. 29-31, 2002, Aberdeen, UK. [Abstract Only].
Walters, et al.; "A Study of Jets from Unsintered-Powder Metal Lined Nonprecision Small-Caliber Shaped Charges", Army Research Laboratory, Aberdeen Proving Ground, MD 21005-5066; Feb. 2001.
Wang, et al., "Contact-Damage-Resistant Ceramic/Single-Wall Carbon Nanotubes and Ceramic/Graphite Composites" Nature Materials, vol. 3, Aug. 2004, pp. 539-544.
Watanabe, et al., "Superplastic Deformation Mechanism in Powder Metallurgy Magnesium Alloys and Composites", Acta mater. 49 (2001) pp. 2027-2037.
Watarai, Trend of research and development for magnesium alloys-reducing the weight of structural materials in motor vehicles, (2006) Science and technology trends, Quaterly review No. 18, 84-97.
Welch, et al., "Nonelastomeric Sliding Sleeve Maintains Long Term Integrity in HP/HT Application: Case Histories" [Abstract Only], SPE Eastern Regional Meeting, Oct. 23-25, 1996, Columbus. Ohio.
Xu, et al., "Nanostructured Material-Based Completion Tools Enhance Well Productivity"; International Petroleum Technology Conference; Conference Paper IPTC 16538; International Petroleum Technology Conference 2013; 4 pages.

(56) References Cited

OTHER PUBLICATIONS

Zeng, et al. "Progress and Challenge for Magnesium Alloys as Biomaterials," Advanced Engineering Materials, vol. 10, Issue 8, Aug. 2008, pp. B3-B14.
Zhan, et al., "Single-wall carbon nanotubes as attractive toughening agents in alumina-based nanocomposites" Nature Materials, vol. 2., Jan. 2003, pp. 38-42.
Zhang, et al.; "Formation of metal nanowires on suspended single-walled carbon nanotubes" Applied Physics Letter, vol. 77, No. 19 (2000), pp. 3015-3017.
Zhang, et al.; "High Strength Nanostructured Materials and Their Oil Field Applications"; Society of Petroleum Engineers; Conference Paper SPE 157092; SPE International Oilfield Nanotechnology Conference, 2012; 6 pages.
Zhang, et al.; "Metal Coating on Suspended Carbon Nanotubes and its Implication to Metal—Tube Interaction", Chemical Physics Letters 331 (2000) 35-41.
Zhang, et al.; "Study on the Environmentally Friendly Anodizing of AZ91D Magnesium Alloy"; Surface and Coatings Technology: 161; pp. 36-43; (2002).
Zhu, et al., "The process of coating on ultrafine particles by surface hydrolysis reaction in a fluidized bed reactor", Surface and Coatings Technology 135 (2000) 14-17.
Bououdina, et al., "Comparative Study of Mechanical Alloying of (Mg+Al) and (Mg+Al+Ni) Mixtures for Hydrogen Storage", J. Alloys, Compds, 2002, 336, 222-231.
Canadian Office Action for Canadian Application No. 2,783,241, dated Feb. 25, 2013, pp. 1-3.
Canadian Office Action for Canadian Application No. 2,783,346, dated Feb. 21, 2013, pp. 1-4.
Carrejo, et al., "Improving Flow Assurance in Multi-Zone Fracturing Treatments in Hydrocarbon Reservoirs with High Strength Corrodible Tripping Balls"; Society of Petroleum Engineers; SPE Paper No. 151613; Apr. 16, 2012; 6 pages.
Feng, et al., "Electroless Plating of Carbon Nanotubes with Silver" Journal of Materials Science, 39, (2004) pp. 3241-3243.
Garfield, New One-Trip Sand-Control Completion System that Eliminates Formation Damage Resulting From conventional Perforating and Gravel-Packing Operations:, SPE Annual Technical Conference and Exhibition, Oct. Sep. 12, 2005.
Gray, et al., "Protective Coatings on Magnesium and Its Alloys—a Critical Review", Journal of Alloys and Compounds 336 (2002), pp. 88-113.
Hsiao, et al., "Anodization of AZ91D Magnesium Alloy in Silicate-Containing Electrolytes"; Surface & Coatings Technology; 199; pp. 127-134; (2005).
Hsiao, et al., "Characterization of Anodic Films Formed on AZ91D Magnesium Alloy"; Surface & Coatings Technology; 190; pp. 299-308; (2005).
Hsiao, et al., "Effect of Heat Treatment on Anodization and Electrochemical Behavior of AZ91D Magnesium Alloy"; J. Mater. Res.; 20(10); pp. 2763-2771;(2005).
Huo et al.; "Corrosion of AZ91D Magnesium Alloy with a Chemical Conversion Coating and Electroless Nickel Layer"; Corrosion Science: 46; pp. 1467-1477; (2004).
International Search Report and Written Opinion; International Application No. PCT/US2010/057763; International Filing Date: Nov. 23, 2010; Date of Mailing: Jul. 28, 2011; 10 pages.
International Search Report and Written Opinion; International Application No. PCT/US2010/059257; International Filing Date: Dec. 7, 2010; Date of Mailing: Jul. 27, 2011; 8 pages.
International Search Report and Written Opinion; International Application No. PCT/US2010/059259; International Filing Date: Dec. 7, 2010; Date of Mailing: Jun. 13, 2011; 8 pages.
International Search Report and Written Opinion; International Application No. PCT/US2010/059263; International Filing Date: Dec. 7, 2010; Date of Mailing: Jul. 8, 2011; 9 pages.
International Search Report and Written Opinion; International Application No. PCT/US2010/059265; International Filing Date: Dec. 7, 2010; Date of Mailing: Jun. 16, 2011; 8 pages.
International Search Report and Written Opinion; International Application No. PCT/US2010/059268; International Filing Date: Dec. 7, 2010; Date of Mailing: Jun. 17, 2011; 8 pages.
International Search Report and Written Opinion; International Application No. PCT/US2011/043036; International Filing Date: Jul. 6, 2011; Date of Mailing: Feb. 23, 2012; 9 pages.
International Search Report and Written Opinion; International Application No. PCT/US2011/047000; International Filing Date: Aug. 9, 2011; Date of Mailing: Dec. 26, 2011; 8 pages.
International Search Report and Written Opinion; International Application No. PCT/US2011/058099; International Filing Date: Oct. 27, 2011; Date of Mailing: May 11, 2012; 12 pages.
International Search Report and Written Opinion; International Application No. PCT/US2011/058105; International Filing Date: Oct. 27, 2011; Date of Mailing: May 1, 2012; 8 pages.
International Search Report and Written Opinion; International Application No. PCT/US2012/034973; International Filing Date: Apr. 25, 2012; Date of Mailing: Nov. 29, 2012; 8 pages.
International Search Report and Written Opinion; International Application No. PCT/US2012/034978; International Filing Date: Apr. 25, 2012; Date of Mailing: Nov. 12, 2012; 9 pages.
International Search Report and Written Opinion; International Application No. PCT/US2012/038622; International Filing Date: May 18, 2012; Date of Mailing: Dec. 6, 2012; 12 pages.
International Search Report and Written Opinion; International Application No. PCT/US2012/044866; International Filing Date: Jun. 29, 2012; Date of Mailing: Jan. 2, 2013; 9 pages.
International Search Report and Written Opinion; International Application No. PCT/US2012/046231; International Filing Date: Jul. 11, 2012; Date of Mailing: Jan. 29, 2013; 9 pages.
International Search Report and Written Opinion; International Application No. PCT/US2012/049434; International Filing Date: Aug. 3, 2012; Date of Mailing: Feb. 1, 2013; 7 pages.
International Search Report and Written Opinion; International Application No. PCT/US2012/053339; International Filing Date: Aug. 31, 2012; Date of Mailing: Feb. 15, 2013; 11 pages.
International Search Report and Written Opinion; International Application No. PCT/US2012/053342; International Filing Date: Aug. 31, 2012; Date of Mailing: Feb. 19, 2013; 9 pages.
International Search Report and Written Opinion; International Application No. PCT/US2012/053350; International Filing Date: Aug. 31, 2012; Date of Mailing: Feb. 25, 2013; 10 pages.
International Search Report and Written Opinion; International Application No. PCT/US2012/071742; International Filing Date: Dec. 27, 2012; Date of Mailing: Apr. 22, 2013; 12 pages.
International Search Report and Written Opinion; International Application No. PCT/US2014/049347; International Filing Date: Aug. 1, 2014; Date of Mailing: Nov. 24, 2014; 11 pages.
International Search Report and Written Opinion; International Application No. PCT/US2014/054720; International Filing Date: Sep. 9, 2014; Date of Mailing: Dec. 17, 2014; 10 pages.
International Search Report and Written Opinion; International Application No. PCT/US2014/058997, International Filing Date: Oct. 3, 2014; Date of Mailing: Jan. 12, 2015; 12 pages.
International Search Report and Written Opinion; International Application No. PCT/US2012/044229; International Filing Date: Jun. 26, 2012; Date of Mailing: Jan. 30, 2013; 3 pages.
"Optisleeve Sliding Sleeve", [online]; [retrieved on Jun. 25, 2010]; retrieved from the Internet weatherford.com/weatherford/groups/.../weatherfordcorp/WFT033159.pdf.
"Reactivity series", Wikipedia, http://en.wikipedia.org/w/index.php?title=Reactivity_series&printable=yes downloaded on May 18, 2014. 8 pages.
"Sliding Sleeve", Omega Completion Technology Ltd, Sep. 29, 2009, retrieved on: www.omega-completion.com.
Adams, et al.; "Thermal stabilities of aromatic acids as geothermal tracers", Geothemnics, vol. 21, No. 3, 1992, pp. 323-339.
Ambat, et al., "Electroless Nickel-Plating on AZ91D Magnesium Alloy: Effect of Substrate Microstructure and Plating Parameters"; Surface and Coatings Technology; 179; pp. 124-134; (2004).
Ayman, et al.; "Effect of Consolidation and Extrusion Temperatures on Tensile Properties of Hot Extruded ZK61 Magnesium Alloy Gas

(56) References Cited

OTHER PUBLICATIONS

Atomized Powders via Spark Plasma Sintering", Transactions of JWRI, vol. 38 (2009), No. 2, pp. 1-5.
Baker Hughes Incorporated. IN-Tallic Disintegrating Frac Balls. Houston: Baker Hughes Incorporated, 2011. Accessed Mar. 6, 2015.
Baker Hughes, "Flow Control Systems," [online]; [retrieved on May 20, 2010]; retrieved from the Internet http://www.bakerhughes.com/products-and-services/completions-and-productions/well-completions/packers-and-flow-control/flow-control-systems.
Baker Hughes, "Multistage", Oct. 31, 2011, BakerHughes.com; accessed Mar. 6, 2015.
Baker Oil Tools, "Baker Oil Tools Introduces Revolutionary Sand Control Completion Technology," May 2, 2005.
Baker Oil Tools, "Z-Seal Metal-to-Metal Expandable Sealing Device Uses Expanding Metal in Place of Elastomers," Nov. 6, 2006.
Bastow, et al., "Clustering and formation of nano-precipitates in dilute aluminum and magnesium alloys", Materials Science and Engineering, 2003, C23, 757-762.
Bercegeay, et al., "A One-Trip Gravel Packing System"; Society of Petroleum Engineers, Offshort Technology Conference, SPE Paper No. 4771; Feb. 7-8, 1974.
Birbilis, et al., "Exploring Corrosion Protection of Mg Via Ionic Liquid Pretreatment", Surface & Coatings Technology; 201, pp. 4496-4504, (2007).
Bybee, "One-Trip Completion System Eliminates Perforations," Completions Today, Sep. 2007, pp. 52-53.
Canadian Office Action for Canadian Application No. 2,783,547, dated Feb. 15, 2013, pp. 1-3.
Canadian Office Action for Canadian Application No. 2,833,958, dated Sep. 23, 2014, pp. 1-2.
Canadian Office Action for Canadian Application No. 2,833,981, dated Sep. 23, 2014, pp. 1-2.
Chang, et al., "Electrodeposition of Aluminum on Magnesium Alloy in Aluminum Chloride (A1C13)-1-ethyl-3-methylimidazolium chloride (EMIC) Ionic Liquid and Its Corrosion Behavior"; Electrochemistry Communications; 9; pp. 1602-1606; (2007).
Chinese Office Action for Chinese Application No. 201080055613.5, dated Nov. 4, 2014, pp. 1-20.
Chinese Office Action for Chinese Application No. 201180012447.5, dated Jul. 3, 2014, 7 pages.
Chinese Office Action for Chinese Application No. 201180052095.6, dated Jul. 21, 2014, pp. 1-32.
Christoglou, et al., "Deposition of Aluminum on Magnesium by a CVD Process", Surface and Coatings Technology 184 (2004) 149-155.
Constantine, "Selective Production of Horizontal Openhole Completions Using ECP and Sliding Sleeve Technology." SPE Rocky Mountain Regional Meeting, May 15-18, 1999, Gillette, Wyoming. [Abstract Only].
Curtin, et al., "CNT-reinforced ceramics and metals," Materials Today, 2004, vol. 7, pp. 44-49.
Flahaut, et al., "Carbon Nanotube-Metal-Oxide Nanocomposites: Microstructure, Electrical Conductivity and Mechanical Properties" Acta amter. 48 (2000), pp. 3803-3812.
Forsyth, et al.; "An Ionic Liquid Surface Treatment for Corrosion Protection of Magnesium Alloy AZ31"; Electrochem. Solid-State Lett. 2006 vol. 9, Issue 11, B52-B55/ 9(11); Abstract only; 1 page.
Galanty, et al. "Consolidation of metal powders during the extrusion process," Journal of Materials Processing Technology (2002), pp. 491-496.
Garfield, et al., "Maximizing Inflow Performance in Soft Sand Completions Using New One-trip Sand Control Liner Completion Technology", SPE European Formation Damage Conference, May 25-27, 2005.
Goh, et al., "Development of novel carbon nanotube reinforced magnesium nanocomposites using the powder metallurgy technique", Nanottechnology 17 (2006) 7-12.
Han, et al., "Mechanical Properties of Nanostructured Materials", Rev. Adv. Mater. Sci. 9(2005) 1-16.
Hermawan, et al., "Iron-manganese: new class of metallic degradable biomaterials prepared by powder metallurgy", Powder Metallurgy, vol. 51, No. 1, (2008), pp. 38-45.
Hjortstam, et al. "Can we achieve ultra-low resistivity in carbon nanotube-based metal composites," Applied Physics a (2004), vol. 78, Issue 8, pp. 1175-1179.
Hsiao, et al., "Baking Treatment Effect on Materials Characteristics and Electrochemical Behavior of anodic Film Formed on AZ91D Magnesium Alloy"; Corrosion Science; 49; pp. 781-793; (2007).
Lavernia, et al.,"Cryomilled Nanostructured Materials: Processing and Properties", Materials Science and Engineering A, 493, (2008) pp. 207-214.
Li, "Design of Abrasive Water Jet Perforation and Hydraulic Fracturing Tool," Oil Field Equipment, Mar. 2011.
Maisano, "Cryomilling of Aluminum-Based and Magnesium-Based Metal Powders", Thesis, Virginia Tech, Jan. 13, 2006.
Seyni, et al., "On the interest of using degradable fillers in co-ground composite materials", Powder Technology 190, (2009) pp. 176-184.
Shigematsu, et al., "Surface Treatment of AZ91D Magnesium Alloy by Aluminum diffusion Coating", Journal of Materials Science Letters 19, 2000, pp. 473-475.
Stanley, et al.; "An Introduction to Ground-Water Tracers", Department of Hydrology and Water Resources, University of Arizona, Mar. 1985, pp. 1-219.
Vahlas, et al., "Principles and Applications of CVD Powder Technology", Materials Science and Engineering R 53 (2006) pp. 1-72.
Zemel, "Tracers in the Oil Field", University of Texas at Austin, Center for Petroleum and Geosystems, Jan. 1995, Chapters 1, 2, 3, 7.
Chinese Office Action for Chinese Patent Application No. 201280041531.4 dated Aug. 31, 2015.
Extended European Search Report; EP Application No. 12822169.4-1605/2739812; Mailing Date: Nov. 17, 2015; 9 pages.
International Search Report and Written Opinion; International Application No. PCT/US2015/066353; International Filing Date: Dec. 17, 2015; Date of Mailing: Apr. 1, 2016; 14 pages.
M.S. Senthil Saravanan et al, "Mechanically Alloyed Carbon Nanotubes (CNT) Reinforced Nanocrystalline AA 4032: Synthesis and Characterization", Journal of Minerals and Materials Characterization and Engineering, vol. 9, No. 11 pp. 1027-1035 2010.
Australian Examination Report for Australian patent application No. 2012302067 dated Sep. 22, 2015.
Australian Examination Report; Australian Application No. 2012287461; Date of Mailing: Jul. 13, 2015; 6 pages.
Chinese Office Action for Chinese Application No. 201280036477.4, dated Nov. 4, 2015, pp. 1-15.
Chinese Office Action; Chinese Application No. 201280020572.5; Mailing Date:Oct. 10, 2015; 13 pages.
Chuan-Jun et al., "Study on Corrosion Kinetics of Mg—Ni alloys", Journal of Kunming University of Science and Technology, vol. 34, No. 5, pp. 10-13, Oct. 2009.
European Search Report for EP Application No. 10836533.9 dated Jul. 27, 2015.
European Search Report for EP Application No. 10836538.8 dated Jul. 27, 2015.
European Search Report for EP Application No. 10836539.6 dated Jul. 27, 2015.
European Search Report for EP Application No. 10836540.4 dated Aug. 20, 2015.
Tsipas et al. "Effect of High Energy Ball Milling on Titanium-Hydroxyapatite Powders" Powder Metallurgy, Maney Publishing, London, GB, vol. 46, No. 1, Mar. 2003, pp. 73-77.

\* cited by examiner

DISINTEGRABLE AND CONFORMABLE METALLIC SEAL, AND METHOD OF MAKING THE SAME

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for use, including hydrocarbon production, $CO_2$ capture or sequestration, etc. Disposal of components or tools can be accomplished by milling or drilling the component or tool out of the borehole, which is generally a time consuming and expensive operation. The industry is always receptive to new systems, materials, and methods that eliminate removal of a component or tool from a borehole without such milling and drilling operations.

BRIEF DESCRIPTION

Disclosed herein is a seal comprising: a metal composite including: a cellular nanomatrix comprising a metallic nanomatrix material; a metal matrix disposed in the cellular nanomatrix; and a disintegration agent; a first sealing surface; and a second sealing surface opposingly disposed from the first sealing surface.

Further disclosed is a process for preparing a seal that comprises combining a metal matrix powder, a disintegration agent, and metal nanomatrix material to form a composition; compacting the composition to form a compacted composition; sintering the compacted composition; and pressing the sintered composition to form the seal.

Also disclosed is a method for temporarily sealing a downhole element, the method comprising: applying pressure to deform a seal (as above recited); conforming the seal to a space to form a temporary seal; and contacting the temporary seal with a downhole fluid to disintegrate the temporary seal.

Additionally disclosed is a disintegration agent that comprises a metal, fatty acid, ceramic particle, or a combination comprising at least one of the foregoing disposed among a controlled electrolytic material, wherein the disintegration agent changes the disintegration rate of the controlled electrolytic material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The inventors have discovered that a high strength, high ductility yet fully disintegrable tubular anchoring system can be made from materials that selectively and controllably disintegrate in response to contact with certain downhole fluids or in response to changed conditions. Such a disintegrable system includes components that are selectively corrodible and have selectively tailorable disintegration rates and selectively tailorable material properties. Additionally, the disintegrable system has components that have varying compression and tensile strengths and that include a seal (to form, e.g., a conformable metal-to-metal seal), cone, deformable sleeve (or slips), and bottom sub. As used herein, "disintegrable" refers to a material or component that is consumable, corrodible, degradable, dissolvable, weakenable, or otherwise removable. It is to be understood that use herein of the term "disintegrate," or any of its forms (e.g., "disintegration"), incorporates the stated meaning.

Figure 1:
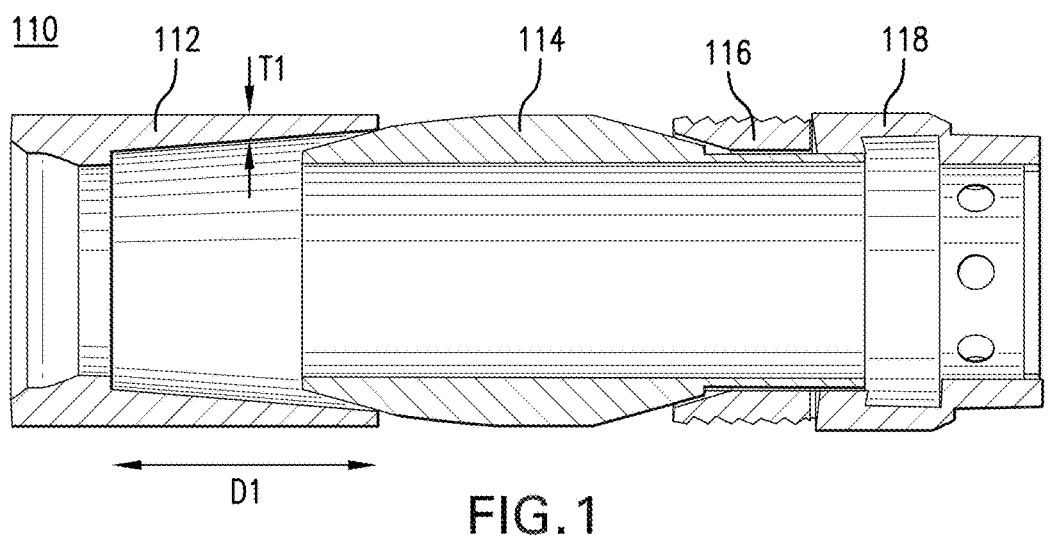
FIG. 1 depicts a cross sectional view of a disintegrable tubular anchoring system.

An embodiment of a disintegrable tubular anchoring system is show in FIG. 1. The disintegrable tubular anchoring system 110 includes a seal 112, frustoconical member 114, a sleeve 116 (shown herein as a slip ring), and a bottom sub 118. The system 110 is configured such that longitudinal movement of the frustoconical member 114 relative to the sleeve 116 and relative to the seal 112 causes the sleeve 116 and seal 112 respectively to be radially altered. Although in this embodiment the radial alterations are in radially outward directions, in alternate embodiments the radial alterations could be in other directions such as radially inward. Additionally, a longitudinal dimension D1 and thickness T1 of a wall portion of the seal 112 can be altered upon application of a compressive force thereto. The seal 112, frustoconical member 114, sleeve 116, and bottom sub 118 (i.e., components of the system 110) are disintegrable and contain a metal composite. The metal composite includes a metal matrix disposed in a cellular nanomatrix and a disintegration agent.

In an embodiment, the disintegration agent is disposed in the metal matrix. In another embodiment, the disintegration agent is disposed external to the metal matrix. In yet another embodiment, the disintegration agent is disposed in the metal matrix as well as external to the metal matrix. The metal composite also includes the cellular nanomatrix that comprises a metallic nanomatrix material. The disintegration agent can be disposed in the cellular nanomatrix among the metallic nanomatrix material. An exemplary metal composite and method used to make the metal composite are disclosed in U.S. patent application Ser. Nos. 12/633,682, 12/633,688, 13/220,832, 13/220,822, and 13/358,307, the disclosure of each of which patent application is incorporated herein by reference in its entirety.

Figure 2:
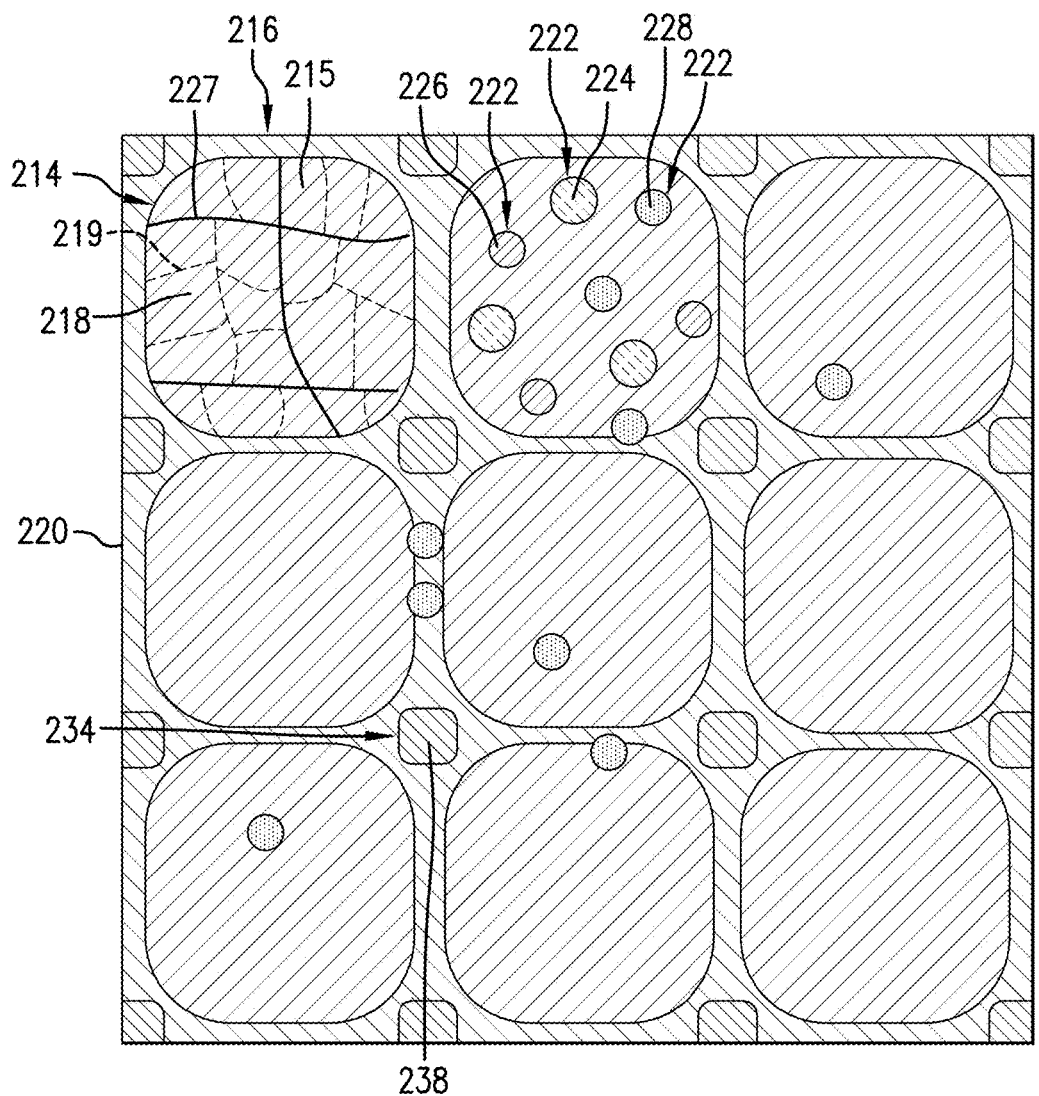
FIG. 2 depicts a cross sectional view of a disintegrable metal composite.

The metal composite is, for example, a powder compact as shown in FIG. 2. The metal composite 200 includes a cellular nanomatrix 216 comprising a nanomatrix material 220 and a metal matrix 214 (e.g., a plurality of dispersed particles) comprising a particle core material 218 dispersed in the cellular nanomatrix 216. The particle core material 218 comprises a nanostructured material. Such a metal composite having the cellular nanomatrix with metal matrix disposed therein is referred to as controlled electrolytic material.

Figure 4:
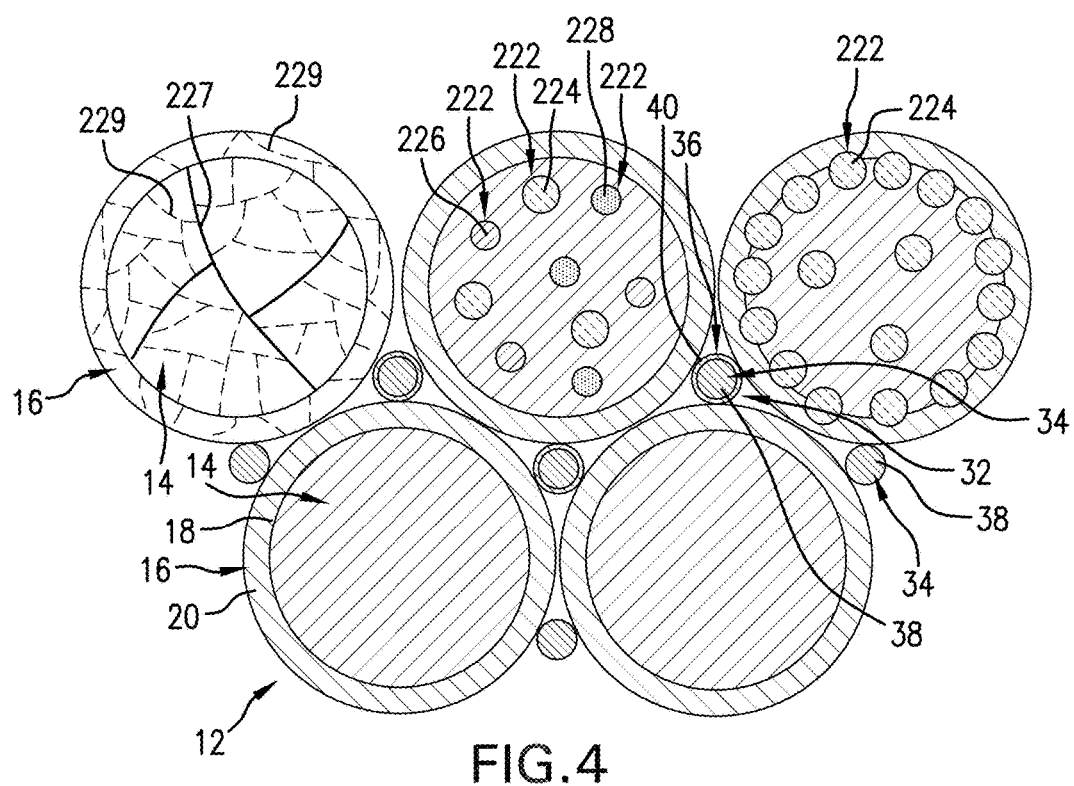
FIG. 4 depicts a cross sectional view of a composition used to make the disintegrable metal composite shown in FIG. 2.

With reference to FIGS. 2 and 4, metal matrix 214 can include any suitable metallic particle core material 218 that includes nanostructure as described herein. In an exemplary embodiment, the metal matrix 214 is formed from particle cores 14 (FIG. 4) and can include an element such as aluminum, iron, magnesium, manganese, zinc, or a combination thereof, as the nanostructured particle core material 218. More particularly, in an exemplary embodiment, the metal matrix 214 and particle core material 218 can include various Al or Mg alloys as the nanostructured particle core material 218, including various precipitation hardenable alloys Al or Mg alloys. In some embodiments, the particle core material 218 includes magnesium and aluminum where the aluminum is present in an amount of about 1 weight percent (wt %) to about 15 wt %, specifically about 1 wt % to about 10 wt %, and more specifically about 1 wt % to about 5 wt %, based on the weight of the metal matrix, the balance of the weight being magnesium.

In an additional embodiment, precipitation hardenable Al or Mg alloys are particularly useful because they can strengthen the metal matrix 214 through both nanostructuring and precipitation hardening through the incorporation of particle precipitates as described herein. The metal matrix 214 and particle core material 218 also can include a rare earth element, or a combination of rare earth elements. Exemplary rare earth elements include Sc, Y, La, Ce, Pr, Nd, or Er. A combination comprising at least one of the foregoing rare earth elements can be used. Where present, the rare earth element can be present in an amount of about 5 wt % or less, and specifically about 2 wt % or less, based on the weight of the metal composite.

The metal matrix 214 and particle core material 218 also can include a nanostructured material 215. In an exemplary embodiment, the nanostructured material 215 is a material having a grain size (e.g., a subgrain or crystallite size) that is less than about 200 nanometers (nm), specifically about 10 nm to about 200 nm, and more specifically an average grain size less than about 100 nm. The nanostructure of the metal matrix 214 can include high angle boundaries 227, which are usually used to define the grain size, or low angle boundaries 229 that may occur as substructure within a particular grain, which are sometimes used to define a crystallite size, or a combination thereof. It will be appreciated that the nanocellular matrix 216 and grain structure (nanostructured material 215 including grain boundaries 227 and 229) of the metal matrix 214 are distinct features of the metal composite 200. Particularly, nanocellular matrix 216 is not part of a crystalline or amorphous portion of the metal matrix 214.

The disintegration agent is included in the metal composite 200 to control the disintegration rate of the metal composite 200. The disintegration agent can be disposed in the metal matrix 214, the cellular nanomatrix 216, or a combination thereof. According to an embodiment, the disintegration agent includes a metal, fatty acid, ceramic particle, or a combination comprising at least one of the foregoing, the disintegration agent being disposed among the controlled electrolytic material to change the disintegration rate of the controlled electrolytic material. In one embodiment, the disintegration agent is disposed in the cellular nanomatrix external to the metal matrix. In a non-limiting embodiment, the disintegration agent increases the disintegration rate of the metal composite 200. In another embodiment, the disintegration agent decreases the disintegration rate of the metal composite 200. The disintegration agent can be a metal including cobalt, copper, iron, nickel, tungsten, zinc, or a combination comprising at least one of the foregoing. In a further embodiment, the disintegration agent is the fatty acid, e.g., fatty acids having 6 to 40 carbon atoms. Exemplary fatty acids include oleic acid, stearic acid, lauric acid, hyroxystearic acid, behenic acid, arachidonic acid, linoleic acid, linolenic acid, recinoleic acid, palmitic acid, montanic acid, or a combination comprising at least one of the foregoing. In yet another embodiment, the disintegration agent is ceramic particles such as boron nitride, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, or a combination comprising at least one of the foregoing. Additionally, the ceramic particle can be one of the ceramic materials discussed below with regard to the strengthening agent. Such ceramic particles have a size of 5 μm or less, specifically 2 μm or less, and more specifically 1 μm or less. The disintegration agent can be present in an amount effective to cause disintegration of the metal composite 200 at a desired disintegration rate, specifically about 0.25 wt % to about 15 wt %, specifically about 0.25 wt % to about 10 wt %, specifically about 0.25 wt % to about 1 wt %, based on the weight of the metal composite.

In an exemplary embodiment, the cellular nanomatrix 216 includes aluminum, cobalt, copper, iron, magnesium, nickel, silicon, tungsten, zinc, an oxide thereof, a nitride thereof, a carbide thereof, an intermetallic compound thereof, a cermet thereof, or a combination comprising at least one of the foregoing. The metal matrix can be present in an amount from about 50 wt % to about 95 wt %, specifically about 60 wt % to about 95 wt %, and more specifically about 70 wt % to about 95 wt %, based on the weight of the seal. Further, the amount of the metal nanomatrix material is about 10 wt % to about 50 wt %, specifically about 20 wt % to about 50 wt %, and more specifically about 30 wt % to about 50 wt %, based on the weight of the seal.

In another embodiment, the metal composite includes a second particle. As illustrated generally in FIGS. 2 and 4, the metal composite 200 can be formed using a coated metallic powder 10 and an additional or second powder 30, i.e., both powders 10 and 30 can have substantially the same particulate structure without having identical chemical compounds. The use of an additional powder 30 provides a metal composite 200 that also includes a plurality of dispersed second particles 234, as described herein, that are dispersed within the cellular nanomatrix 216 and are also dispersed with respect to the metal matrix 214. Thus, the dispersed second particles 234 are derived from second powder particles 32 disposed in the powder 10, 30. In an exemplary embodiment, the dispersed second particles 234 include Ni, Fe, Cu, Co, W, Al, Zn, Mn, Si, an oxide thereof, nitride thereof, carbide thereof, intermetallic compound thereof, cermet thereof, or a combination comprising at least one of the foregoing.

Referring again to FIG. 2, the metal matrix 214 and particle core material 218 also can include an additive particle 222. The additive particle 222 provides a dispersion strengthening mechanism to the metal matrix 214 and provides an obstacle to, or serves to restrict, the movement of dislocations within individual particles of the metal matrix 214. Additionally, the additive particle 222 can be disposed in the cellular nanomatrix 216 to strengthen the metal composite 200. The additive particle 222 can have any suitable size and, in an exemplary embodiment, can have an average particle size of about 10 nm to about 1 micron, and specifically about 50 nm to about 200 nm. Here, size refers to the largest linear dimension of the additive particle. The additive particle 222 can include any suitable form of particle, including an embedded particle 224, a precipitate particle 226, or a dispersoid particle 228. Embedded particle 224 can include any suitable embedded particle, including various hard particles. The embedded particle can include various metal, carbon, metal oxide, metal nitride, metal carbide, intermetallic compound, cermet particle, or a combination thereof. In an exemplary embodiment, hard particles can include Ni, Fe, Cu, Co, W, Al, Zn, Mn, Si, an oxide thereof, nitride thereof, carbide thereof, intermetallic compound thereof, cermet thereof, or a combination comprising at least one of the foregoing. The additive particle can be present in an amount of about 0.5 wt % to about 25 wt %, specifically about 0.5 wt % to about 20 wt %, and more specifically about 0.5 wt % to about 10 wt %, based on the weight of the metal composite.

In metal composite 200, the metal matrix 214 dispersed throughout the cellular nanomatrix 216 can have an equi-axed structure in a substantially continuous cellular nanomatrix 216 or can be substantially elongated along an axis so that individual particles of the metal matrix 214 are oblately or prolately shaped, for example. In the case where the metal matrix 214 has substantially elongated particles, the metal matrix 214 and the cellular nanomatrix 216 may be continuous or discontinuous. The size of the particles that make up the metal matrix 214 can be from about 50 nm to about 800 µm, specifically about 500 nm to about 600 µm, and more specifically about 1 µm to about 500 µm. The particle size of can be monodisperse or polydisperse, and the particle size distribution can be unimodal or bimodal. Size here refers to the largest linear dimension of a particle.

Figure 3:
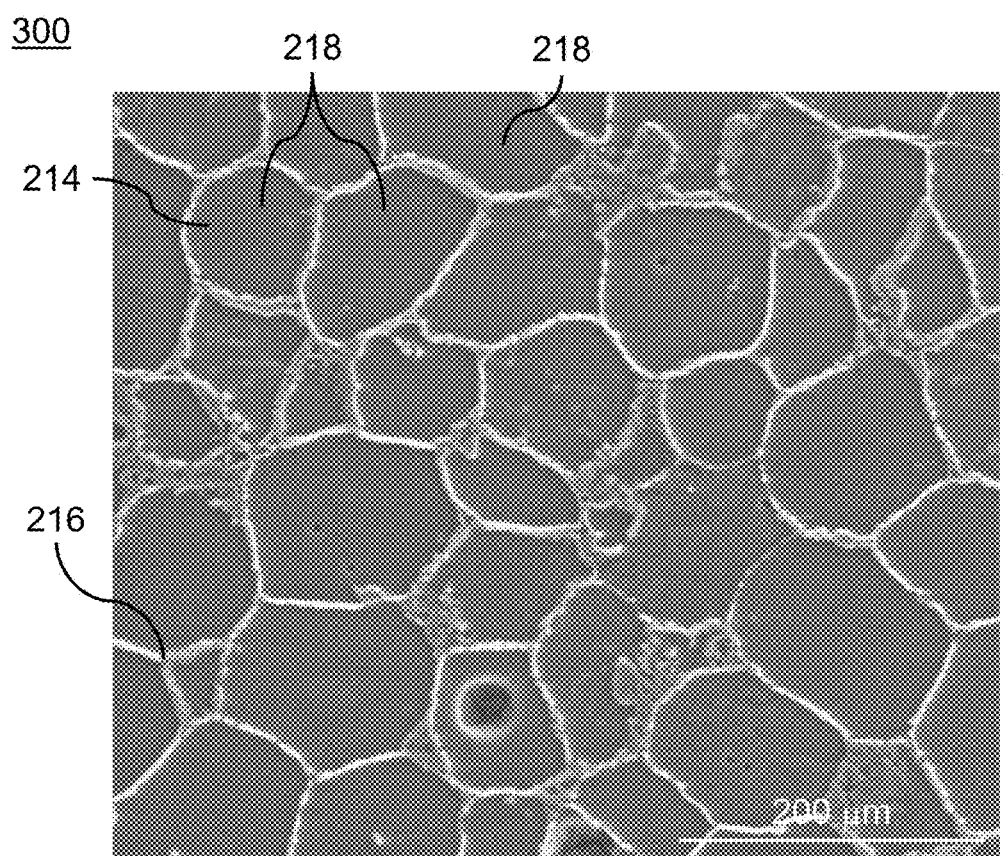
FIG. 3 is a photomicrograph of an exemplary embodiment of a disintegrable metal composite as disclosed herein.

Referring to FIG. 3 a photomicrograph of an exemplary embodiment of a metal composite is shown. The metal composite 300 has a metal matrix 214 that includes particles having a particle core material 218. Additionally, each particle of the metal matrix 214 is disposed in a cellular nanomatrix 216. Here, the cellular nanomatrix 216 is shown as a white network that substantially surrounds the component particles of the metal matrix 214.

According to an embodiment, the metal composite is formed from a combination of, for example, powder constituents. As illustrated in FIG. 4, a powder 10 includes powder particles 12 that have a particle core 14 with a core material 18 and metallic coating layer 16 with coating material 20. These powder constituents can be selected and configured for compaction and sintering to provide the metal composite 200 that is lightweight (i.e., having a relatively low density), high-strength, and selectably and controllably removable, e.g., by disintegration, from a borehole in response to a change in a borehole property, including being selectably and controllably disintegrable (e.g., by having a selectively tailorable disintegration rate curve) in an appropriate borehole fluid, including various borehole fluids as disclosed herein.

The nanostructure can be formed in the particle core 14 used to form metal matrix 214 by any suitable method, including a deformation-induced nanostructure such as can be provided by ball milling a powder to provide particle cores 14, and more particularly by cryomilling (e.g., ball milling in ball milling media at a cryogenic temperature or in a cryogenic fluid, such as liquid nitrogen) a powder to provide the particle cores 14 used to form the metal matrix 214. The particle cores 14 may be formed as a nanostructured material 215 by any suitable method, such as, for example, by milling or cryomilling of prealloyed powder particles of the materials described herein. The particle cores 14 may also be formed by mechanical alloying of pure metal powders of the desired amounts of the various alloy constituents. Mechanical alloying involves ball milling, including cryomilling, of these powder constituents to mechanically enfold and intermix the constituents and form particle cores 14. In addition to the creation of nanostructure as described above, ball milling, including cryomilling, can contribute to solid solution strengthening of the particle core 14 and core material 18, which in turn can contribute to solid solution strengthening of the metal matrix 214 and particle core material 218. The solid solution strengthening can result from the ability to mechanically intermix a higher concentration of interstitial or substitutional solute atoms in the solid solution than is possible in accordance with the particular alloy constituent phase equilibria, thereby providing an obstacle to, or serving to restrict, the movement of dislocations within the particle, which in turn provides a strengthening mechanism in the particle core 14 and the metal matrix 214. The particle core 14 can also be formed with a nanostructure (grain boundaries 227, 229) by methods including inert gas condensation, chemical vapor condensation, pulse electron deposition, plasma synthesis, crystallization of amorphous solids, electrodeposition, and severe plastic deformation, for example. The nanostructure also can include a high dislocation density, such as, for example, a dislocation density between about $10^{17}$ m$^{-2}$ and about $10^{18}$ m$^{-2}$, which can be two to three orders of magnitude higher than similar alloy materials deformed by traditional methods, such as cold rolling.

The substantially-continuous cellular nanomatrix 216 (see FIG. 3) and nanomatrix material 220 formed from metallic coating layers 16 by the compaction and sintering of the plurality of metallic coating layers 16 with the plurality of powder particles 12, such as by cold isostatic pressing (CIP), hot isostatic pressing (HIP), or dynamic forging. The chemical composition of nanomatrix material 220 may be different than that of coating material 20 due to diffusion effects associated with the sintering. The metal composite 200 also includes a plurality of particles that make up the metal matrix 214 that comprises the particle core material 218. The metal matrix 214 and particle core material 218 correspond to and are formed from the plurality of particle cores 14 and core material 18 of the plurality of powder particles 12 as the metallic coating layers 16 are sintered together to form the cellular nanomatrix 216. The chemical composition of particle core material 218 may also be different than that of core material 18 due to diffusion effects associated with sintering.

As used herein, the term cellular nanomatrix 216 does not connote the major constituent of the powder compact, but rather refers to the minority constituent or constituents, whether by weight or by volume. This is distinguished from most matrix composite materials where the matrix comprises the majority constituent by weight or volume. The use of the term substantially continuous, cellular nanomatrix is intended to describe the extensive, regular, continuous and interconnected nature of the distribution of nanomatrix material 220 within the metal composite 200. As used herein, "substantially continuous" describes the extension of the nanomatrix material 220 throughout the metal composite 200 such that it extends between and envelopes substantially all of the metal matrix 214. Substantially continuous is used to indicate that complete continuity and regular order of the cellular nanomatrix 220 around individual particles of the metal matrix 214 are not required. For example, defects in the coating layer 16 over particle core 14 on some powder particles 12 may cause bridging of the particle cores 14 during sintering of the metal composite 200, thereby causing localized discontinuities to result within the cellular nanomatrix 216, even though in the other portions of the powder compact the cellular nanomatrix 216 is substantially continuous and exhibits the structure described herein. In contrast, in the case of substantially elongated particles of the metal matrix 214 (i.e., non-equiaxed shapes), such as those formed by extrusion, "substantially discontinuous" is used to indicate that incomplete continuity and disruption (e.g., cracking or separation) of the nanomatrix around each particle of the metal matrix 214, such as may occur in a predetermined extrusion direction. As used herein, "cellular" is used to indicate that the nanomatrix defines a network of generally repeating, interconnected, compartments or cells of nanomatrix material 220 that encompass and also interconnect the metal matrix 214. As used herein, "nanomatrix" is used to describe the size or scale of the matrix, particularly the thickness of the matrix between adjacent particles of the metal matrix 214. The metallic coating layers that are sintered together to form the nanomatrix are themselves nanoscale thickness coating layers. Since the cellular nanomatrix 216 at most locations, other than the intersection of more than two particles of the metal matrix 214, generally comprises the interdiffusion and bonding of two coating layers 16 from adjacent powder particles 12 having nanoscale thicknesses, the cellular nanomatrix 216 formed also has a nanoscale thickness (e.g., approximately two times the coating layer thickness as described herein) and is thus described as a nanomatrix. Further, the use of the term metal matrix 214 does not connote the minor constituent of metal composite 200, but rather refers to the majority constituent or constituents, whether by weight or by volume. The use of the term metal matrix is intended to convey the discontinuous and discrete distribution of particle core material 218 within metal composite 200.

Embedded particle 224 can be embedded by any suitable method, including, for example, by ball milling or cryomilling hard particles together with the particle core material 18. A precipitate particle 226 can include any particle that can be precipitated within the metal matrix 214, including precipitate particles 226 consistent with the phase equilibria of constituents of the materials, particularly metal alloys, of interest and their relative amounts (e.g., a precipitation hardenable alloy), and including those that can be precipitated due to non-equilibrium conditions, such as may occur when an alloy constituent that has been forced into a solid solution of the alloy in an amount above its phase equilibrium limit, as is known to occur during mechanical alloying, is heated sufficiently to activate diffusion mechanisms that enable precipitation. Dispersoid particles 228 can include nanoscale particles or clusters of elements resulting from the manufacture of the particle cores 14, such as those associated with ball milling, including constituents of the milling media (e.g., balls) or the milling fluid (e.g., liquid nitrogen) or the surfaces of the particle cores 14 themselves (e.g., metallic oxides or nitrides). Dispersoid particles 228 can include an element such as, for example, Fe, Ni, Cr, Mn, N, O, C, H, and the like. The additive particles 222 can be disposed anywhere in conjunction with particle cores 14 and the metal matrix 214. In an exemplary embodiment, additive particles 222 can be disposed within or on the surface of metal matrix 214 as illustrated in FIG. 2. In another exemplary embodiment, a plurality of additive particles 222 are disposed on the surface of the metal matrix 214 and also can be disposed in the cellular nanomatrix 216 as illustrated in FIG. 2.

Similarly, dispersed second particles 234 may be formed from coated or uncoated second powder particles 32 such as by dispersing the second powder particles 32 with the powder particles 12. In an exemplary embodiment, coated second powder particles 32 may be coated with a coating layer 36 that is the same as coating layer 16 of powder particles 12, such that coating layers 36 also contribute to the nanomatrix 216. In another exemplary embodiment, the second powder particles 232 may be uncoated such that dispersed second particles 234 are embedded within nanomatrix 216. The powder 10 and additional powder 30 may be mixed to form a homogeneous dispersion of dispersed particles 214 and dispersed second particles 234 or to form a non-homogeneous dispersion of these particles. The dispersed second particles 234 may be formed from any suitable additional powder 30 that is different from powder 10, either due to a compositional difference in the particle core 34, or coating layer 36, or both of them, and may include any of the materials disclosed herein for use as second powder 30 that are different from the powder 10 that is selected to form powder compact 200.

In an embodiment, the metal composite optionally includes a strengthening agent. The strengthening agent increases the material strength of the metal composite. Exemplary strengthening agents include a ceramic, polymer, metal, nanoparticles, cermet, and the like. In particular, the strengthening agent can be silica, glass fiber, carbon fiber, carbon black, carbon nanotubes, borides, oxides, carbides, nitrides, silicides, borides, phosphides, sulfides, cobalt, nickel, iron, tungsten, molybdenum, tantalum, titanium, chromium, niobium, boron, zirconium, vanadium, silicon, palladium, hafnium, aluminum, copper, or a combination comprising at least one of the foregoing. According to an embodiment, a ceramic and metal is combined to form a cermet, e.g., tungsten carbide, cobalt nitride, and the like. Exemplary strengthening agents particularly include magnesia, mullite, thoria, beryllia, urania, spinels, zirconium oxide, bismuth oxide, aluminum oxide, magnesium oxide, silica, barium titanate, cordierite, boron nitride, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride, tantalum boride, molybdenum boride, tungsten boride, cerium sulfide, titanium sulfide, magnesium sulfide, zirconium sulfide, or a combination comprising at least one of the foregoing. Non-limiting examples of strengthening agent polymers include polyurethanes, polyimides, polycarbonates, and the like.

In one embodiment, the strengthening agent is a particle with size of about 100 microns or less, specifically about 10 microns or less, and more specifically 500 nm or less. In another embodiment, a fibrous strengthening agent can be combined with a particulate strengthening agent. It is believed that incorporation of the strengthening agent can increase the strength and fracture toughness of the metal composite. Without wishing to be bound by theory, finer (i.e., smaller) sized particles can produce a stronger metal composite as compared with larger sized particles. Moreover, the shape of strengthening agent can vary and includes fiber, sphere, rod, tube, and the like. The strengthening agent can be present in an amount of 0.01 weight percent (wt %) to 20 wt %, specifically 0.01 wt % to 10 wt %, and more specifically 0.01 wt % to 5 wt %.

In a process for preparing a component of a disintegrable anchoring system (e.g., a seal, frustoconical member, sleeve, bottom sub, and the like) containing a metal composite, the process includes combining a metal matrix powder, disintegration agent, metal nanomatrix material, and optionally a strengthening agent to form a composition; compacting the composition to form a compacted composition; sintering the compacted composition; and pressing the sintered composition to form the component of the disintegrable system. The members of the composition can be mixed, milled, blended, and the like to form the powder 10 as shown in FIG. 4 for example. It should be appreciated that the metal nanomatrix material is a coating material disposed on the metal matrix powder that, when compacted and sintered, forms the cellular nanomatrix. A compact can be formed by pressing (i.e., compacting) the composition at a pressure to form a green compact. The green compact can be subsequently pressed under a pressure of about 15,000 psi to about 100,000 psi, specifically about 20,000 psi to about 80,000 psi, and more specifically about 30,000 psi to about 70,000 psi, at a temperature of about 250° C. to about 600° C., and specifically about 300° C. to about 450° C., to form the powder compact. Pressing to form the powder compact can include compression in a mold. The powder compact can be further machined to shape the powder compact to a useful shape. Alternatively, the powder compact can be pressed into the useful shape. Machining can include cutting, sawing, ablating, milling, facing, lathing, boring, and the like using, for example, a mill, table saw, lathe, router, electric discharge machine, and the like.

The metal matrix 200 can have any desired shape or size, including that of a cylindrical billet, bar, sheet, toroid, or other form that may be machined, formed or otherwise used to form useful articles of manufacture, including various wellbore tools and components. Pressing is used to form a component of the disintegrable anchoring system (e.g., seal, frustoconical member, sleeve, bottom sub, and the like) from the sintering and pressing processes used to form the metal composite 200 by deforming the powder particles 12, including particle cores 14 and coating layers 16, to provide the full density and desired macroscopic shape and size of the metal composite 200 as well as its microstructure. The morphology (e.g. equiaxed or substantially elongated) of the individual particles of the metal matrix 214 and cellular nanomatrix 216 of particle layers results from sintering and deformation of the powder particles 12 as they are compacted and interdiffuse and deform to fill the interparticle spaces of the metal matrix 214 (FIG. 2). The sintering temperatures and pressures can be selected to ensure that the density of the metal composite 200 achieves substantially full theoretical density.

The metal composite has beneficial properties for use in, for example a downhole environment. In an embodiment, a component of the disintegrable anchoring system made of the metal composite has an initial shape that can be run downhole and, in the case of the seal and sleeve, can be subsequently deformed under pressure. The metal composite is strong and ductile with a percent elongation of about 0.1% to about 75%, specifically about 0.1% to about 50%, and more specifically about 0.1% to about 25%, based on the original size of the component of the disintegrable anchoring system. The metal composite has a yield strength of about 15 kilopounds per square inch (ksi) to about 50 ksi, and specifically about 15 ksi to about 45 ksi. The compressive strength of the metal composite is from about 30 ksi to about 100 ksi, and specifically about 40 ksi to about 80 ksi. The components of the disintegrable anchoring system can have the same or different material properties, such as percent elongation, compressive strength, tensile strength, and the like.

Unlike elastomeric materials, the components of the disintegrable anchoring system herein that include the metal composite have a temperature rating up to about 1200° F., specifically up to about 1000° F., and more specifically about 800° F. The disintegrable anchoring system is temporary in that the system is selectively and tailorably disintegrable in response to contact with a downhole fluid or change in condition (e.g., pH, temperature, pressure, time, and the like). Moreover, the components of the disintegrable anchoring system can have the same or different disintegration rates or reactivities with the downhole fluid. Exemplary downhole fluids include brine, mineral acid, organic acid, or a combination comprising at least one of the foregoing. The brine can be, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. On the other hand, produced water can be water extracted from a production reservoir (e.g., hydrocarbon reservoir), produced from the ground. Produced water is also referred to as reservoir brine and often contains many components such as barium, strontium, and heavy metals. In addition to the naturally occurring brines (seawater and produced water), completion brine can be synthesized from fresh water by addition of various salts such as KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. The above brines can be modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, cesium formate, and the like. The salt can be present in the brine in an amount from about 0.5 wt. % to about 50 wt. %, specifically about 1 wt. % to about 40 wt. %, and more specifically about 1 wt. % to about 25 wt. %, based on the weight of the composition.

In another embodiment, the downhole fluid is a mineral acid that can include hydrochloric acid, nitric acid, phosphoric acid, sulfuric acid, boric acid, hydrofluoric acid, hydrobromic acid, perchloric acid, or a combination comprising at least one of the foregoing. In yet another embodiment, the downhole fluid is an organic acid that can include a carboxylic acid, sulfonic acid, or a combination comprising at least one of the foregoing. Exemplary carboxylic acids include formic acid, acetic acid, chloroacetic acid, dichloroacetic acid, trichloroacetic acid, trifluoroacetic acid, propionic acid, butyric acid, oxalic acid, benzoic acid, phthalic acid (including ortho-, meta- and para-isomers), and the like. Exemplary sulfonic acids include alkyl sulfonic acid or aryl sulfonic acid. Alkyl sulfonic acids include, e.g., methane sulfonic acid. Aryl sulfonic acids include, e.g., benzene sulfonic acid or toluene sulfonic acid. In one embodiment, the alkyl group may be branched or unbranched and may contain from one to about 20 carbon atoms and can be substituted or unsubstituted. The aryl group can be alkyl-substituted, i.e., may be an alkylaryl group, or may be attached to the sulfonic acid moiety via an alkylene group (i.e., an arylalkyl group). In an embodiment, the aryl group may be substituted with a heteroatom. The aryl group can have from about 3 carbon atoms to about 20 carbon atoms and include a polycyclic ring structure.

The disintegration rate (also referred to as dissolution rate) of the metal composite is about 1 milligram per square centimeter per hour ($mg/cm^2/hr$) to about 10,000 $mg/cm^2/hr$, specifically about 25 $mg/cm^2/hr$ to about 1000 $mg/cm^2/hr$, and more specifically about 50 $mg/cm^2/hr$ to about 500 $mg/cm^2/hr$. The disintegration rate is variable upon the composition and processing conditions used to form the metal composite herein.

Figure 5A:
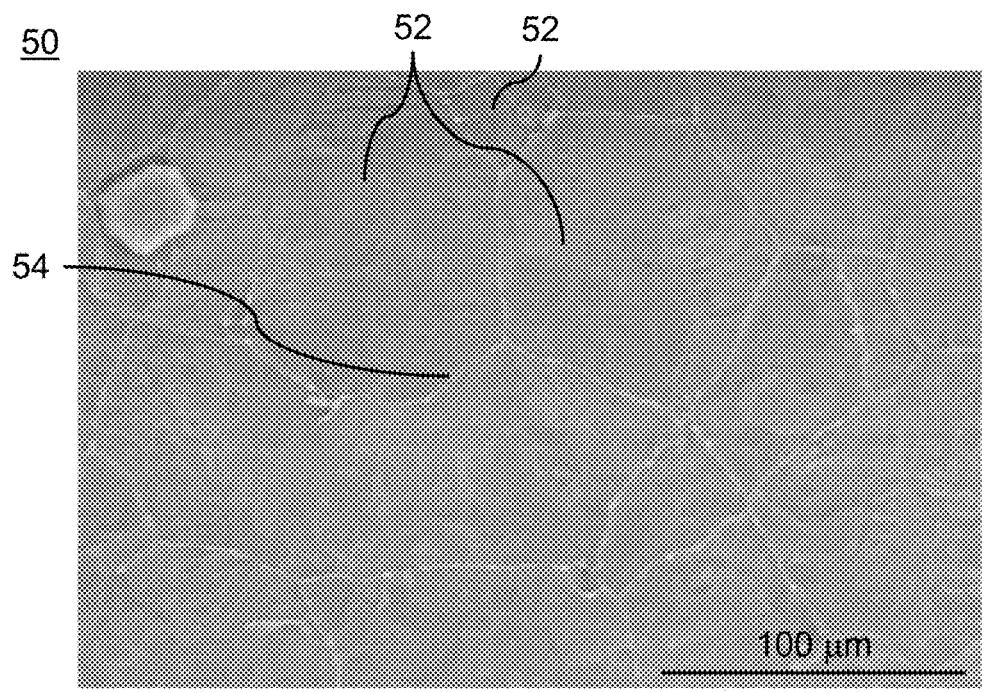
FIG. 5A is a photomicrograph of a pure metal without a cellular nanomatrix.
Figure 5B:
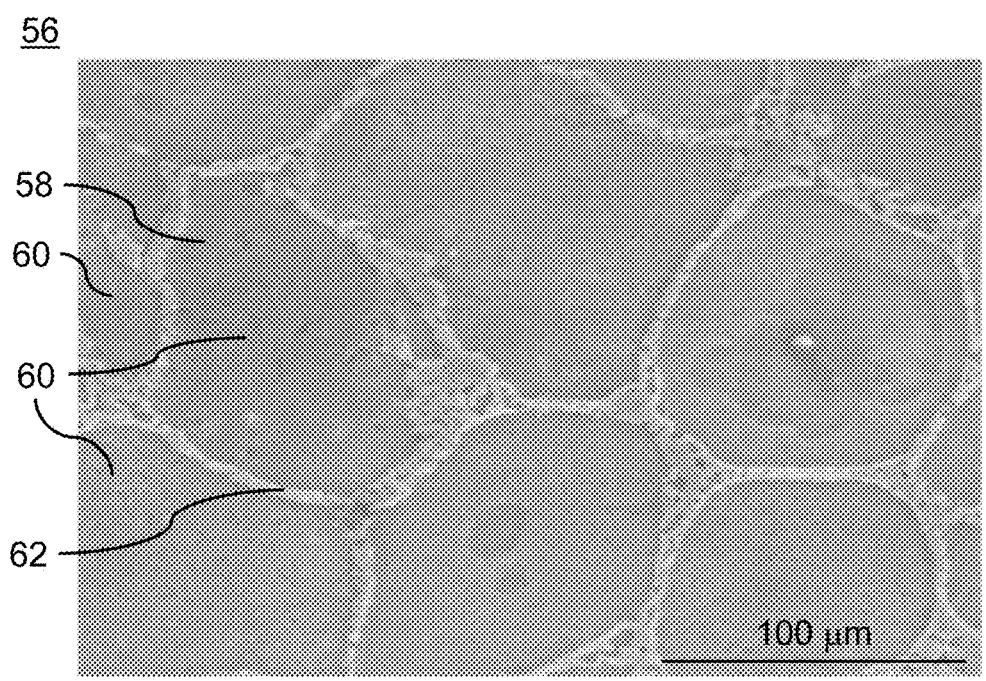
FIG. 5B is a photomicrograph of a disintegrable metal composite with a metal matrix and cellular nanomatrix.

Without wishing to be bound by theory, the unexpectedly high disintegration rate of the metal composite herein is due to the microstructure provided by the metal matrix and cellular nanomatrix. As discussed above, such microstructure is provided by using powder metallurgical processing (e.g., compaction and sintering) of coated powders, wherein the coating produces the nanocellular matrix and the powder particles produce the particle core material of the metal matrix. It is believed that the intimate proximity of the cellular nanomatrix to the particle core material of the metal matrix in the metal composite produces galvanic sites for rapid and tailorable disintegration of the metal matrix. Such electrolytic sites are missing in single metals and alloys that lack a cellular nanomatrix. For illustration, FIG. 5A shows a compact 50 formed from magnesium powder. Although the compact 50 exhibits particles 52 surrounded by particle boundaries 54, the particle boundaries constitute physical boundaries between substantially identical material (particles 52). However, FIG. 5B shows an exemplary embodiment of a composite metal 56 (a powder compact) that includes a metal matrix 58 having particle core material 60 disposed in a cellular nanomatrix 62. The composite metal 56 was formed from aluminum oxide coated magnesium particles where, under powder metallurgical processing, the aluminum oxide coating produces the cellular nanomatrix 62, and the magnesium produces the metal matrix 58 having particle core material 60 (of magnesium). Cellular nanomatrix 62 is not just a physical boundary as the particle boundary 54 in FIG. 5A but is also a chemical boundary interposed between neighboring particle core materials 60 of the metal matrix 58. Whereas the particles 52 and particle boundary 54 in compact 50 (FIG. 5A) do not have galvanic sites, metal matrix 58 having particle core material 60 establish a plurality of galvanic sites in conjunction with the cellular nanomatrix 62. The reactivity of the galvanic sites depend on the compounds used in the metal matrix 58 and the cellular nanomatrix 62 as is an outcome of the processing conditions used to the metal matrix and cellular nanomatrix microstructure of the metal composite.

Figure 6:
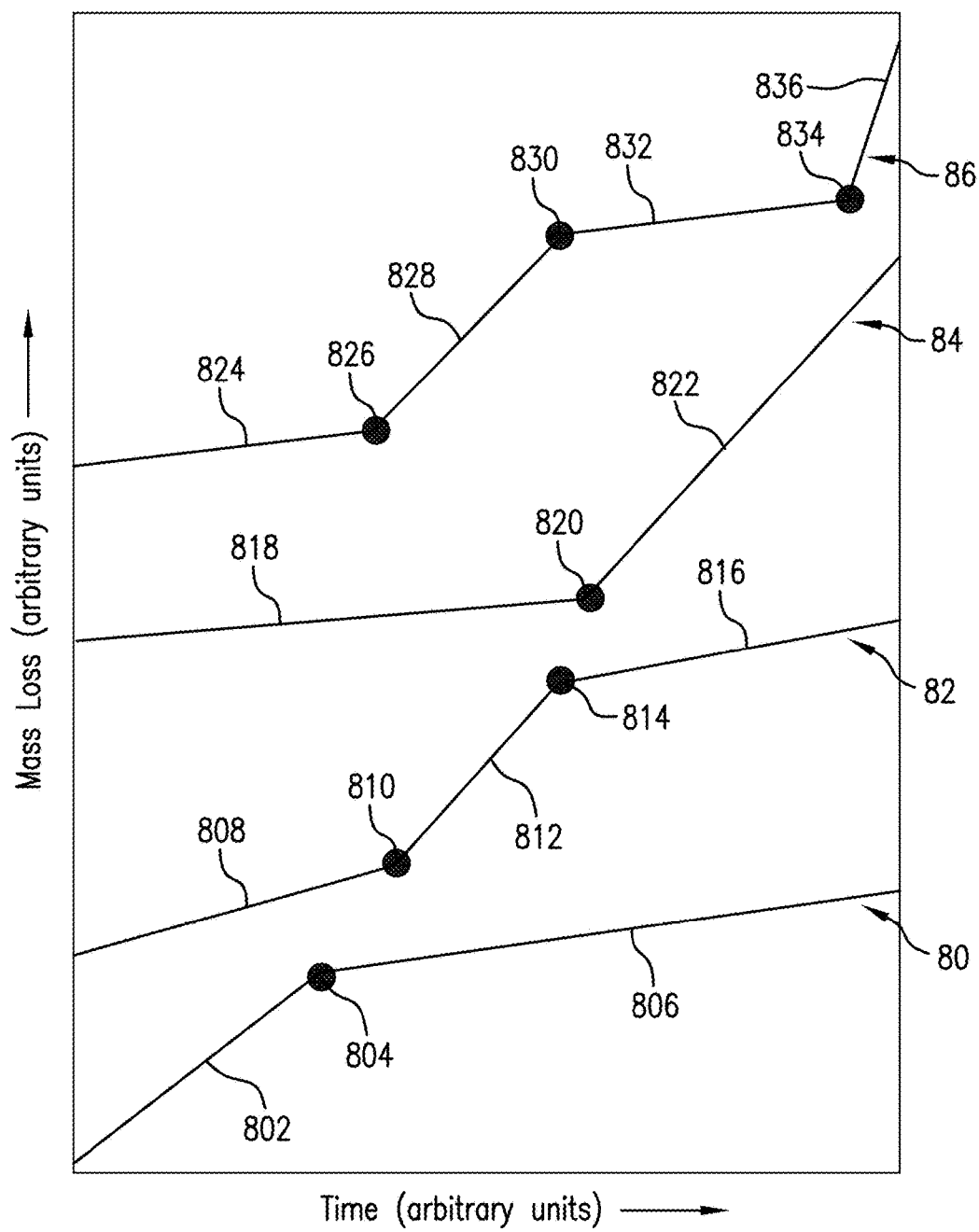
FIG. 6 is a graph of mass loss versus time for various disintegrable metal composites that include a cellular nanomatrix indicating selectively tailorable disintegration rates.

Moreover, the microstructure of the metal composites herein is controllable by selection of powder metallurgical processing conditions and chemical materials used in the powders and coatings. Therefore, the disintegration rate is selectively tailorable as illustrated for metal composites of various compositions in FIG. 6, which shows a graph of mass loss versus time for various metal composites that include a cellular nanomatrix. Specifically, FIG. 6 displays disintegration rate curves for four different metal composites (metal composite A 80, metal composite B 82 metal composite C 84, and metal composite D 86). The slope of each segment of each curve (separated by the black dots in FIG. 6) provides the disintegration rate for particular segments of the curve. Metal composite A 80 has two distinct disintegration rates (802, 806). Metal composite B 82 has three distinct disintegration rates (808, 812, 816). Metal composite C 84 has two distinct disintegration rates (818, 822), and metal composite D 86 has four distinct disintegration rates (824, 828, 832, and 836). At a time represented by points 804, 810, 814, 820, 826, 830, and 834, the rate of the disintegration of the metal composite (80, 82, 84, 86) changes due to a changed condition (e.g., pH, temperature, time, pressure as discussed above). The rate may increase (e.g., going from rate 818 to rate 822) or decrease (e.g., going from rate 802 to 806) along the same disintegration curve. Moreover, a disintegration rate curve can have more than two rates, more than three rates, more than four rates, etc. based on the microstructure and components of the metallic composite. In this manner, the disintegration rate curve is selectively tailorable and distinguishable from mere metal alloys and pure metals that lack the microstructure (i.e., metal matrix and cellular nanomatrix) of the metal composites described herein.

Figure 7A:
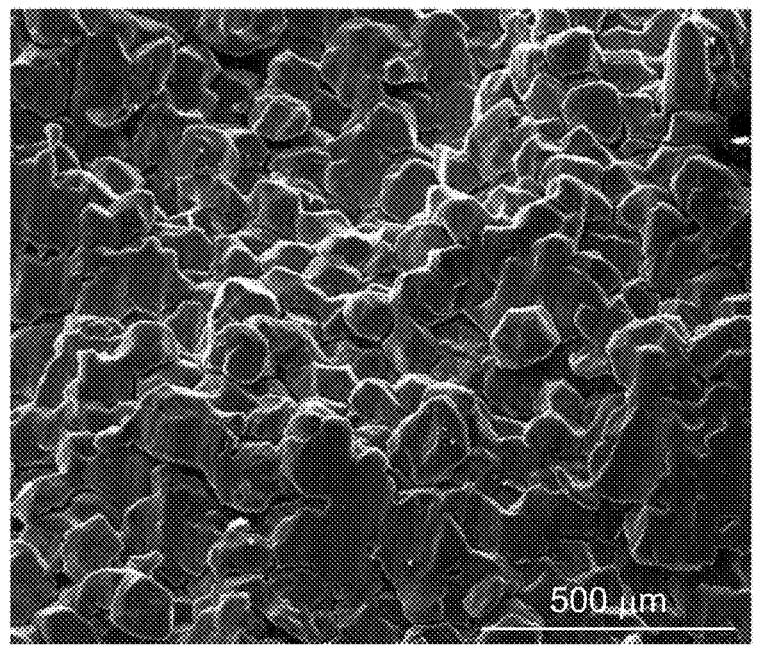
FIG. 7A is an electron photomicrograph of a fracture surface of a compact formed from a pure Mg powder.
Figure 7B:
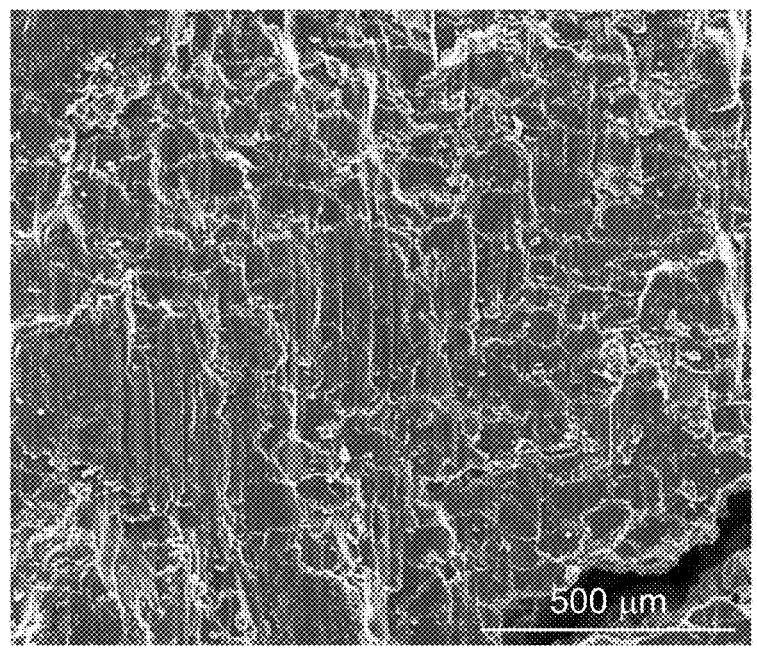
FIG. 7B is an electron photomicrograph of a fracture surface of an exemplary embodiment of a disintegrable metal composite with a cellular nanomatrix as described herein.

Not only does the microstructure of the metal composite govern the disintegration rate behavior of the metal composite but also affects the strength of the metal composite. As a consequence, the metal composites herein also have a selectively tailorable material strength yield (and other material properties), in which the material strength yield varies due to the processing conditions and the materials used to produce the metal composite. To illustrate, FIG. 7A shows an electron photomicrograph of a fracture surface of a compact formed from a pure Mg powder, and FIG. 7B shows an electron photomicrograph of a fracture surface of an exemplary embodiment of a metal composite with a cellular nanomatrix as described herein. The microstructural morphology of the substantially continuous, cellular nanomatrix, which can be selected to provide a strengthening phase material, with the metal matrix (having particle core material), provides the metal composites herein with enhanced mechanical properties, including compressive strength and sheer strength, since the resulting morphology of the cellular nanomatrix/metal matrix can be manipulated to provide strengthening through the processes that are akin to traditional strengthening mechanisms, such as grain size reduction, solution hardening through the use of impurity atoms, precipitation or age hardening and strain/work hardening mechanisms. The cellular nanomatrix/metal matrix structure tends to limit dislocation movement by virtue of the numerous particle nanomatrix interfaces, as well as interfaces between discrete layers within the cellular nanomatrix material as described herein. This is exemplified in the fracture behavior of these materials, as illustrated in FIGS. 7A and 7B. In FIG. 7A, a compact made using uncoated pure Mg powder and subjected to a shear stress sufficient to induce failure demonstrated intergranular fracture. In contrast, in FIG. 7B, a metal composite made using powder particles having pure Mg powder particle cores to form metal matrix and metallic coating layers that includes Al to form the cellular nanomatrix and subjected to a shear stress sufficient to induce failure demonstrated transgranular fracture and a substantially higher fracture stress as described herein. Because these materials have high-strength characteristics, the core material and coating material may be selected to utilize low density materials or other low density materials, such as low-density metals, ceramics, glasses or carbon, that otherwise would not provide the necessary strength characteristics for use in the desired applications, including wellbore tools and components.

Figure 8:
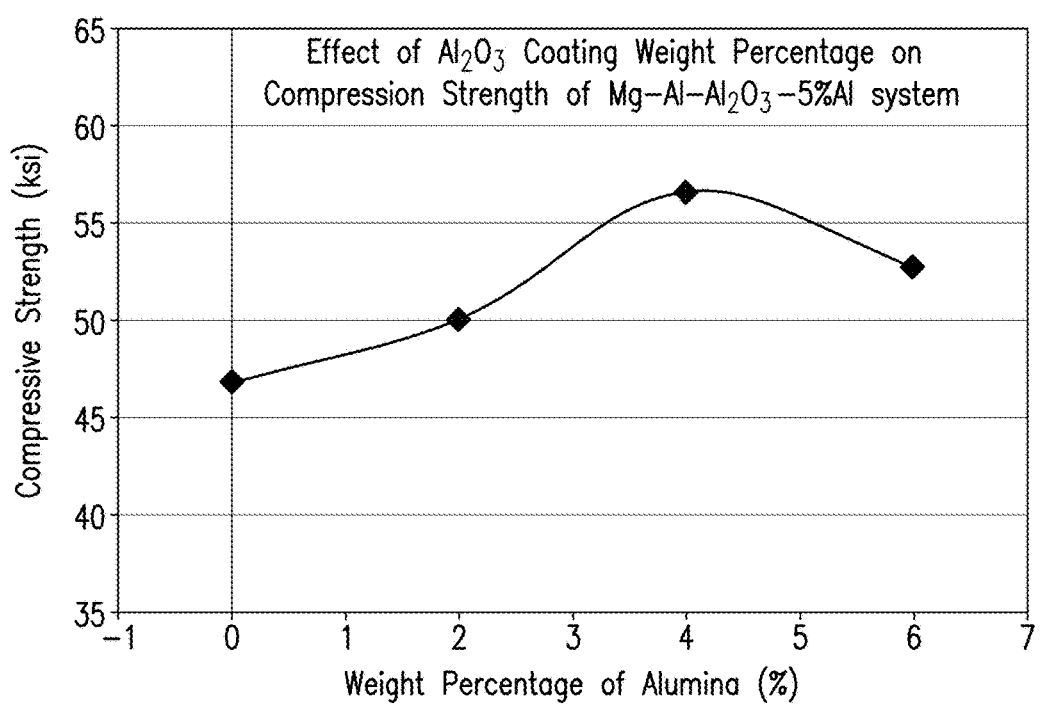
FIG. 8 is a graph of the compressive strength of a metal composite with a cellular nanomatrix versus weight percentage of a constituent ($Al_2O_3$) of the cellular nanomatrix.

To further illustrate the selectively tailorable material properties of the metal composites having a cellular nanomatrix, FIG. 8 shows a graph of the compressive strength of a metal composite with a cellular nanomatrix versus weight percentage of a constituent ($Al_2O_3$) of the cellular nanomatrix. FIG. 8 clearly shows the effect of varying the weight percentage (wt %), i.e., thickness, of an alumina coating on the room temperature compressive strength of a metal composite with a cellular nanomatrix formed from coated powder particles that include a multilayer ($Al/Al_2O_3/Al$) metallic coating layer on pure Mg particle cores. In this example, optimal strength is achieved at 4 wt % of alumina, which represents an increase of 21% as compared to that of 0 wt % alumina.

Thus, the metal composites herein can be configured to provide a wide range of selectable and controllable corrosion or disintegration behavior from very low corrosion rates to extremely high corrosion rates, particularly corrosion rates that are both lower and higher than those of powder compacts that do not incorporate the cellular nanomatrix, such as a compact formed from pure Mg powder through the same compaction and sintering processes in comparison to those that include pure Mg dispersed particles in the various cellular nanomatrices described herein. These metal composites 200 may also be configured to provide substantially enhanced properties as compared to compacts formed from pure metal (e.g., pure Mg) particles that do not include the nanoscale coatings described herein. Moreover, metal alloys (formed by, e.g., casting from a melt or formed by metallurgically processing a powder) without the cellular nanomatrix also do not have the selectively tailorable material and chemical properties as the metal composites herein.

As mentioned above, the metal composite is used to produce articles that can be used as tools or implements, e.g., in a downhole environment. In a particular embodiment, the article is a seal, frustoconical member, sleeve, or bottom sub. In another embodiment, combinations of the articles are used together as a disintegrable tubular anchoring system.

Figure 9A:
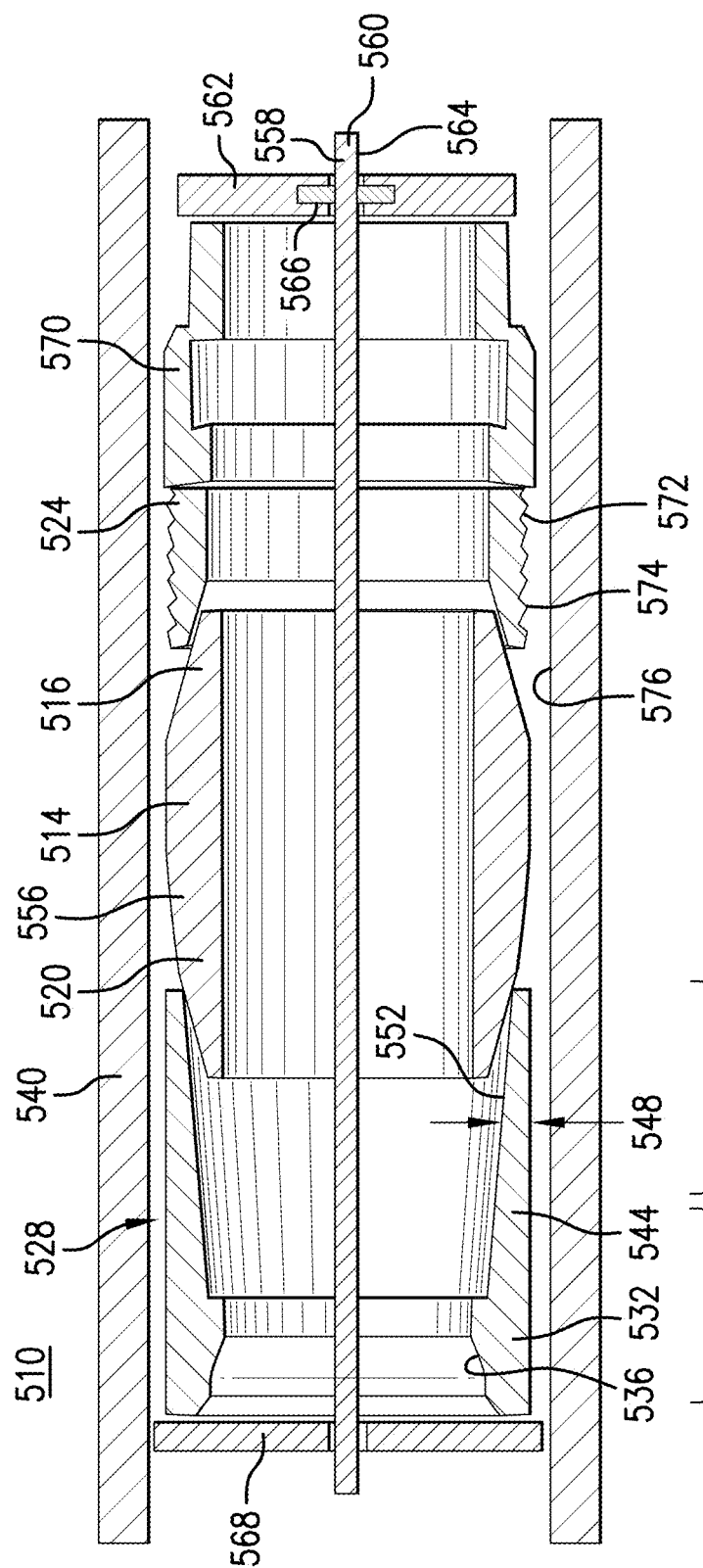
FIG. 9A depicts a cross sectional view of an embodiment of a disintegrable tubular anchoring system in a borehole.
Figure 9B:
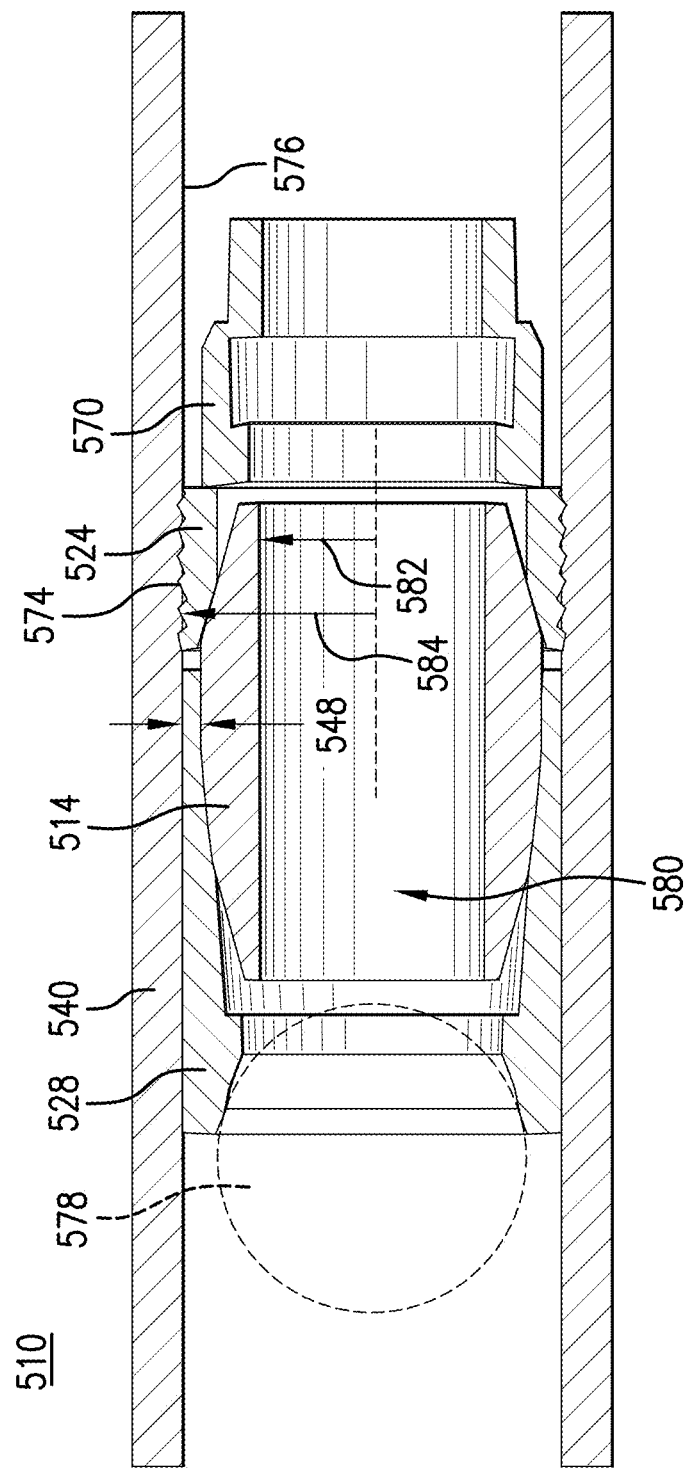
FIG. 9B depicts a cross sectional view of the system of FIG. 9A in a set position.

Referring to FIGS. 9A and 9B, an embodiment of a disintegrable tubular anchoring system disclosed herein is illustrated at 510. The sealing system 510 includes a frustoconical member 514 (also referred to as a cone and shown individually in FIG. 10) having a first frustoconical portion 516 and a second frustoconical portion 520 that are tapered in opposing longitudinal directions to one another. A bottom sub 570 (shown individually in FIG. 11) is disposed at an end of the disintegrable system 510. Sleeve 524 (shown individually in FIG. 12) is radially expandable in response to being moved longitudinally against the first frustoconical portion 516. Similarly, a seal 528 (shown individually in FIGS. 13A and 13B) is radially expandable in response to being moved longitudinally against the second frustoconical portion 520. One way of moving the sleeve 524 and the seal 528 relative to the frustoconical portions 516, 520 is to compress longitudinally the complete assembly with a setting tool 558. The seal 528 includes a seat 532 with a surface 536 that is tapered in this embodiment and is receptive to a plug 578 that can sealingly engage the surface 536 of seal 528.

The seat 532 of the seal 528 also includes a collar 544 that is positioned between the seal 528 and the second frustoconical portion 520. The collar 544 has a wall 548 whose thickness is tapered due to a radially inwardly facing frustoconical surface 552 thereon. The varied thickness of the wall 548 allows for thinner portions to deform more easily than thicker portions. This can be beneficial for at least two reasons. First, the thinner walled portion 549 can deform when the collar 544 is moved relative to the second frustoconical portion 520 in order for the seal 528 to expand radially into sealing engagement with a structure 540. Second, the thicker walled portion 550 should resist deformation due to pressure differential thereacross that is created when pressuring up against a plug (e.g., plug 578) seated at the seat 532 during treatment operations, for example. The taper angle of the frustoconical surface 552 may be selected to match a taper angle of the second frustoconical portion 520 thereby to allow the second frustoconical portion 520 to provide radial support to the collar 544 at least in the areas where they are in contact with one another.

The disintegrable tubular anchoring system 510 is configured to set (i.e., anchor) and seal to a structure 540 such as a liner, casing, or closed or open hole in an earth formation borehole, for example, as is employable in hydrocarbon recovery and carbon dioxide sequestration applications. The sealing and anchoring to the structure 540 allows pressure against the plug 578 seated thereat to increase for treatment of the earth formation as is done during fracturing and acid treatment, for example. Additionally, the seat 532 is positioned in the seal 528 such that pressure applied against a plug seated on the seat 532 urges the seal 528 toward the sleeve 524 to thereby increase both sealing engagement of the seal 528 with the structure 540 and the frustoconical member 514 as well as increasing the anchoring engagement of the sleeve 524 with the structure 540.

The sealing system 510 can be configured such that the sleeve 524 is anchored (positionally fixed) to the structure 540 prior to the seal 528 sealingly engaging with the structure 540, or such that the seal 528 is sealingly engaged with the structure 540 prior to the sleeve 524 anchoring to the structure 540. Controlling which of the seal 528 and the sleeve 524 engages with the structure 540 first can be selected through material properties relationships (e.g., relative compressive strength) or dimensional relationships between the components involved in the setting of the seal 528 in comparison to the components involved in the setting of the sleeve 524. Regardless of whether the sleeve 524 or the seal 528 engages the structure 540 first may be set in response to directions of portions of a setting tool that set the disintegrable tubular anchoring system 510. Damage to the seal 528 can be minimized by reducing or eliminating relative movement between the seal 528 and the structure 540 after the seal 528 is engaged with the structure 540. In this embodiment, having the seal 528 engage with the structure 540 prior to having the sleeve 524 engage the structure 540 can achieve this goal.

The surface 536 of the seat 532 is positioned longitudinally upstream (as defined by fluid flow that urges a plug against the seat 532) of the sleeve 524. Additionally, the seat 536 of the seal can be positioned longitudinally upstream of the collar 544 of the seal 528. This relative positioning allows forces generated by pressure against a plug seated against the land 536 further to urge the seal 528 into sealing engagement with the structure 540.

The portion of the collar 544 that deforms conforms to the second frustoconical portion 520 sufficiently to be radially supported thereby, regardless of whether the taper angles match. The second frustoconical portion 520 can have taper angles from about 1° to about 30°, specifically about 2° to about 20° to facilitate radial expansion of the collar 544 and to allow frictional forces between the collar 544 and the second frustoconical portion 520 to maintain positional relationships therebetween after removal of longitudinal forces that caused the movement therebetween. The first frustoconical portion 516 can also have taper angles from about 10° to about 30°, specifically about 14° to about 20° for the same reasons that the second frustoconical portion 520 does. Either or both of the frustoconical surface 552 and the second frustoconical portion 520 can include more than one taper angle as is illustrated herein on the second frustoconical portion 520 where a nose 556 has a larger taper angle than the surface 520 has further from the nose 556. Having multiple taper angles can provide operators with greater control over amounts of radial expansion of the collar 544 (and subsequently the seal 528) per unit of longitudinal movement between the collar 544 and the frustoconical member 514. The taper angles, in addition to other variables, also provide additional control over longitudinal forces needed to move the collar 544 relative to the frustoconical member 514. Such control can allow the disintegrable tubular anchoring system 510 to expand the collar 544 of the seal 528 to set the seal 528 prior to expanding and setting the sleeve 224.

In an embodiment, the setting tool 558 is disposed along the length of the system 510 from the bottom sub 570 to the seal 528. The setting tool 558 can generate the loads needed to cause movement of the frustoconical member 514 relative to the sleeve 524. The setting tool 558 can have a mandrel 560 with a stop 562 attached to one end 564 by a force failing member 566 such as a plurality of shear screws. The stop 562 is disposed to contact the bottom sub 570. A plate 568 disposed to contact the seal 528 guidingly movable along the mandrel 560 (by means not shown herein) in a direction toward the stop 562 at the bottom sub 570 can longitudinally urge the frustoconical member 514 toward the sleeve 524. Loads to fail the force failing member 566 can be set to only occur after the sleeve 524 has been radially altered by the frustoconical member 514 a selected amount. After failure of the force failing member 566, the stop 562 may separate from the mandrel 560, thereby allowing the mandrel 560 and the plate 568 to be retrieved to surface, for example.

According to an embodiment, the surface 572 of the sleeve 524 includes protrusions 574, which may be referred to as teeth, configured to bitingly engage with a wall 576 of the structure 540, within which the disintegrable system 510 is employable, when the surface 572 is in a radially altered (i.e., expanded) configuration. This biting engagement serves to anchor the disintegrable system 510 to the structure 540 to prevent relative movement therebetween. Although the structure 540 disclosed in this embodiment is a tubular, such as a liner or casing in a borehole, it could be an open hole in an earth formation, for example.

FIG. 9B shows the disintegrable system 510 after the setting tool 558 has been removed from the structure 540 subsequent to setting the disintegrable system 510. Here, the protrusions 574 of the sleeve 524 bitingly engage the wall 576 of the structure 540 to anchor the disintegrable system 510 thereto. Additionally, the seal 528 has been radially expanded to contact the wall 576 of the structure 540 on the outer surface of the seal 528 due to compression thereof by the setting tool 558. The seal 528 deforms such that the length of the seal 528 has increased as the thickness 548 has decreased during compression of the seal 528 between the frustoconical member 514 and the wall 576 of structure 540. In this way, the seal 528 forms a metal-to-metal seal against the frustoconical member 514 and a metal-to-metal seal against the wall 576. Alternatively, the seal 528 can deform to complement topographical features of the wall 576 such as voids, pits, protrusions, and the like. Similarly, the ductility and tensile strength of the seal 528 allow the seal 528 to deform to complement topographical features of the frustoconical member 514.

After setting the disintegrable system 510 with the protrusions 574 of the sleeve 514, a plug 578 can be disposed on the surface 536 of seat 532. Once the plug 578 is sealingly engaged with the seat 536, pressure can increase upstream thereof to perform work such as fracturing an earth formation or actuating a downhole tool, for example, when employed in a hydrocarbon recovery application.

In an embodiment, as show in FIG. 9B, the plug 578, e.g., a ball, engages the seat 532 of seal 528. Pressure is applied, for example, hydraulically, to the plug 578 to deform the collar 544 of the seal 528. Deformation of the collar 544 causes the wall material 548 to elongate and sealably engage with the structure 540 (e.g., borehole casing) to form a metal-to-metal seal with the first frustoconical portion 516 of the frustoconical member 514 and to from another metal-to-metal seal with the structure 576. Here, the ductility of the metal composite allows the seal 528 to fill the space between the structure 540 and the frustoconical member 514. A downhole operation can be performed at this time, and the plug 578 subsequently removed after the operation. Removal of the plug 578 from the seat 532 can occur by creating a pressure differential across the plug 578 such that the plug 578 dislodges from the seat 532 and moves away from the seal 528 and frustoconical member 514. Thereafter, the any of the seal 528, frustoconical member 514, sleeve 524, or bottom sub 570 can be disintegrated by contact with a downhole fluid. Alternatively, before the plug 578 is removed from the seat 532, a downhole fluid can contact and disintegrate the seal 528, and the plug 578 then can be removed from any of the remaining components of the disintegrable system 510. Disintegration of the seal 528, frustoconical member 514, sleeve 524, or bottom sub 570 is beneficial at least in part because the flow path of the borehole is restored without mechanically removing the components of the disintegrable system 510 (e.g., by boring or milling) or flushing the debris out of the borehole. It should be appreciated that the disintegration rates of the components of the disintegrable system 510 are independently selectively tailorable as discussed above, and that the seal 528, frustoconical member 514, sleeve 524, or bottom sub 570 have independently selectively tailorable material properties such as yield strength and compressive strength.

According to another embodiment, the disintegrable tubular anchoring system 510 is configured to leave a through bore 580 with an inner radial dimension 582 and outer radial dimension 584 defined by a largest radial dimension of the disintegrable system 510 when set within the structure 540. In an embodiment, the inner radial dimension 582 can be large enough for mandrel 560 of the setting tool 558 to fit through the system 510. The stop 562 of the setting tool 558 can be left in the structure 540 after setting the disintegrable system 510 and removal of the mandrel 560. The stop 562 can be fished out of the structure 540 after disintegrating the system 510 at least to a point where the stop 562 can pass through the inner radial dimension 582. Thus, a component of the disintegrable system 510 can be substantially solid. By incorporation of the through bore 580 in the disintegrable system 510, a fluid can be circulated through the disintegrable system 510 from either the downstream or upstream direction in the structure 540 to cause disintegration of a component (e.g., the sleeve).

In another embodiment, the disintegrable tubular anchoring system 510 is configured with the inner radial dimension 582 that is large in relation to the outer radial dimension 584. According to one embodiment, the inner radial dimension 582 is greater than 50% of the outer radial dimension 584, specifically greater than 60%, and more specifically greater than 70%.

The seal, frustoconical member, sleeve, and bottom sub can have beneficial properties for use in, for example a downhole environment, either in combination or separately. These components are disintegrable and can be part of a completely disintegrable anchoring system herein. Further, the components have mechanical and chemical properties of the metal composite described herein. The components thus beneficially are selectively and tailorably disintegrable in response to contact with a fluid or change in condition (e.g., pH, temperature, pressure, time, and the like). Exemplary fluids include brine, mineral acid, organic acid, or a combination comprising at least one of the foregoing.

Figure 10:
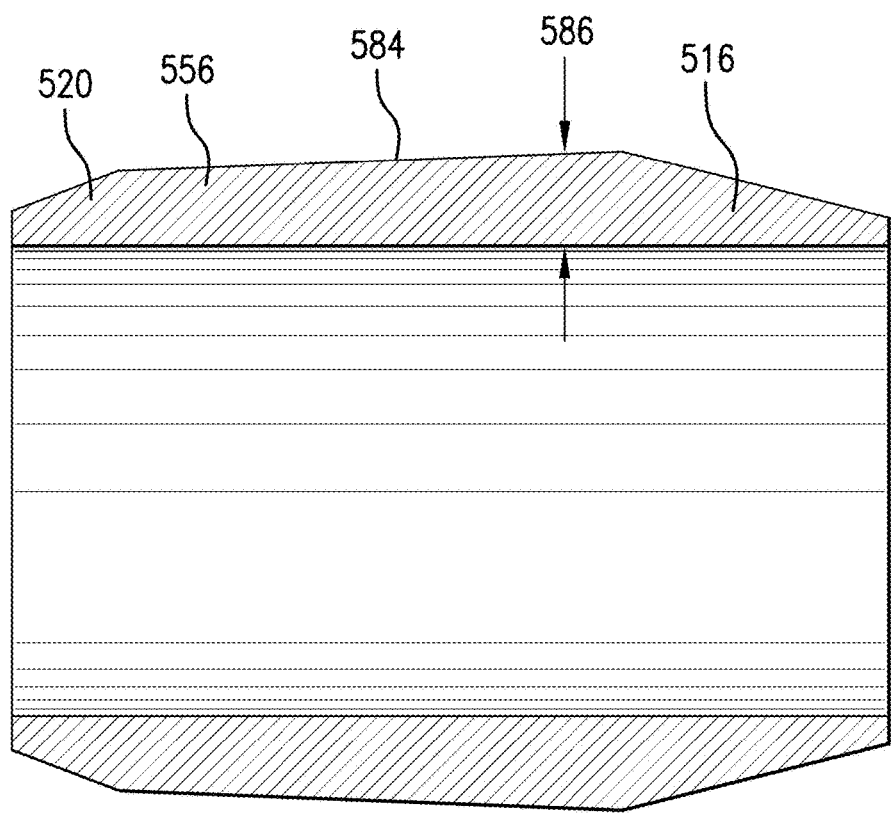
FIG. 10 depicts a cross sectional view of a disintegrable frustoconical member.

A cross sectional view of an embodiment of a frustoconical member is shown in FIG. 10. As described above, the frustoconical member 514 has a first frustoconical portion 516, second frustoconical potion 520, and nose 556. The taper angle of the frustoconical member 514 can vary along the outer surface 584 so that the frustoconical member 514 has various cross sectional shapes including the truncated double cone shape shown. The wall thickness 586 therefore can vary along the length of the frustoconical member 514, and the inner diameter of the frustoconical member 514 can be selected based on a particular application. The frustoconical member 514 can be used in various applications such as in the disintegrable tubular anchoring system herein as well as in any situation in which a strong or disintegrable frustoconical shape is useful. Exemplary applications include a bearing, flare fitting, valve stem, sealing ring, and the like.

Figure 11:
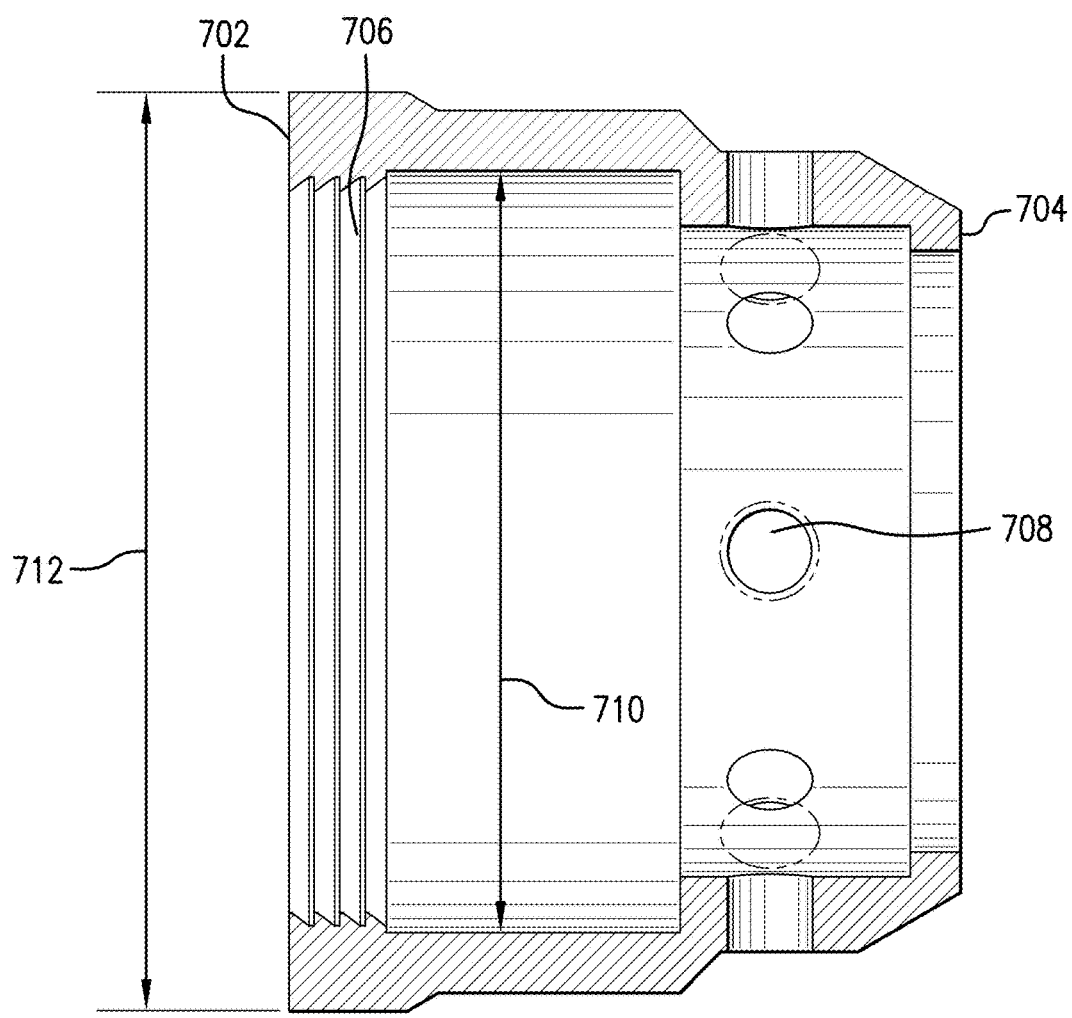
FIG. 11 depicts a cross sectional view of a disintegrable bottom sub.

A cross sectional view of a bottom sub is shown in FIG. 11. The bottom sub 700 has a first end 702, second end 704, optional thread 706, optional through holes 708, inner diameter 710, and outer diameter 712. In an embodiment, the bottom sub 700 is the terminus of a tool (e.g., disintegrable system 510). In another embodiment, the bottom sub 700 is disposed at an end of a string. In certain embodiment, the bottom sub 700 is used to attach tools to a string. Alternatively, the bottom sub 700 can be used between tools or strings and can be part of a joint or coupling. The bottom sub 700 can be used with a string and an article such as a bridge plug, frac plug, mud motor, packer, whip stock, and the like. In one non-limiting embodiment, the first end 702 provides an interface with, e.g., the frustoconical member 514 and the sleeve 524. The second end 704 engages the stop 562 of the setting tool 558. Thread 706, when present, can be used to secure the bottom sub 700 to an article. In an embodiment, the frustoconical member 514 has a threaded portion that mates with the thread 706. In some embodiments, thread 706 is absent, and the inner diameter 710 can be a straight bore or can have portions thereof that are tapered. The through holes 708 can transmit fluid, e.g., brine, to disintegrate the bottom sub 700 or other components of the disintegrable system 510. The through holes also can be an attachment point for the force failing member 566 used in conjunction with the setting tool 558 or similar device. It is contemplated that the bottom sub 700 can have another cross sectional shape than that shown in FIG. 11. Exemplary shapes include a cone, ellipsoid, toroid, sphere, cylinder, their truncated shapes, asymmetrical shapes, including a combination of the foregoing, and the like. Further, the bottom sub 700 can be a solid item or can have an inner diameter that is at least 10% the size of the outer diameter, specifically at least 50%, and more specifically at least 70%.

Figure 12A:
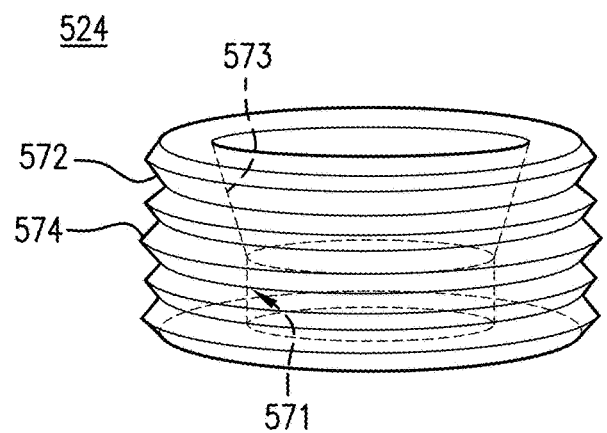
FIGS. 12A, 12B, and 12C respectively depict a perspective view, cross sectional view, and a top view of a disintegrable sleeve.
Figure 12B:
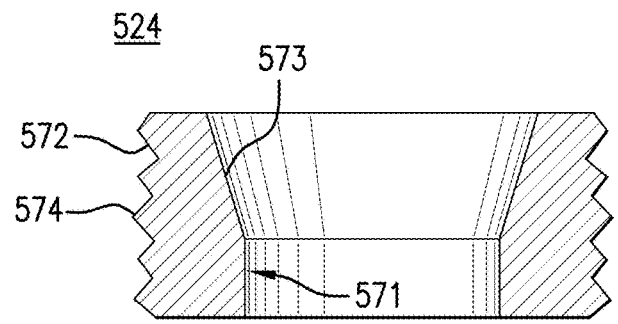
Figure 12C:
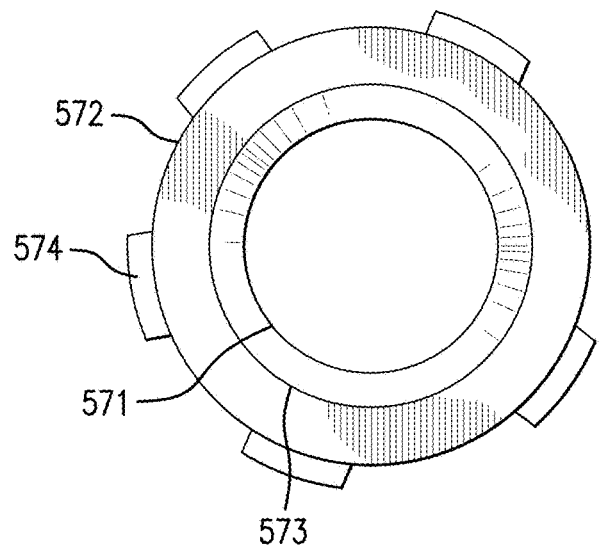

A sleeve is shown in a perspective, cross sectional, and top views respectively in FIGS. 12A, 12B, and 12C. The sleeve 524 includes an outer surface 572, protrusions 574 disposed on the outer surface 572, and inner surface 571. The sleeve 524 acts as a slip ring with the protrusions 574 as slips that bitingly engage a surface such as a wall of a casing or open hole as the sleeve 524 radially expands in response to a first portion 573 of the inner surface 571 engaging a mating surface (e.g., first frustoconical portion 516 in FIG. 10). The protrusions 574 can circumferentially surround the entirety of the sleeve 524. Alternatively, the protrusions 574 can be spaced apart, either symmetrically or asymmetrically, as shown in the top view in FIG. 12C. The shape of the sleeve 524 is not limited to that shown in FIG. 12. The sleeve, in addition to being a slip ring in the disintegrable tubular anchoring system illustrated in FIG. 9, can be used to set numerous tools including a packer, bridge plug, or frac plug or can be disposed in any environment where anti-slipping of an article can be accomplished by engaging the protrusions of the sleeve with a mating surface.

Figure 13A:
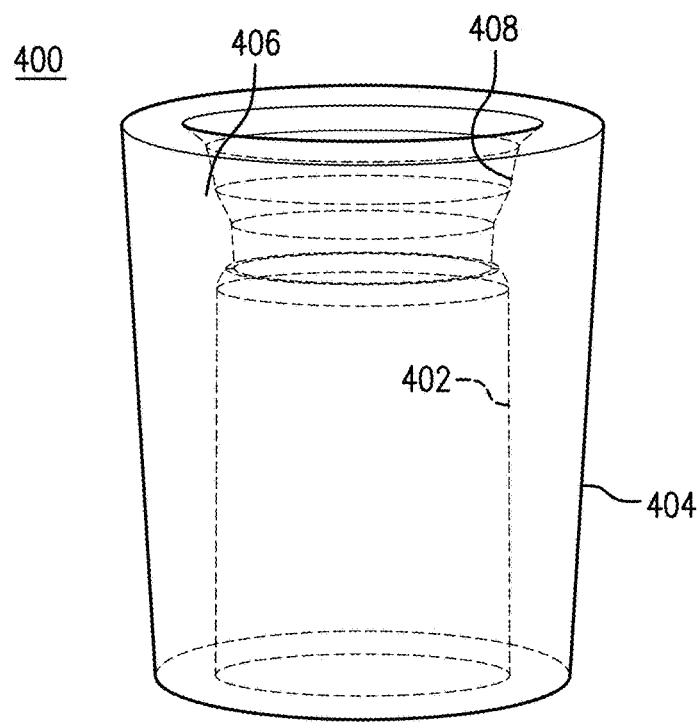
FIGS. 13A and 13B respectively depict a perspective view and cross sectional view of a disintegrable seal.
Figure 13B:
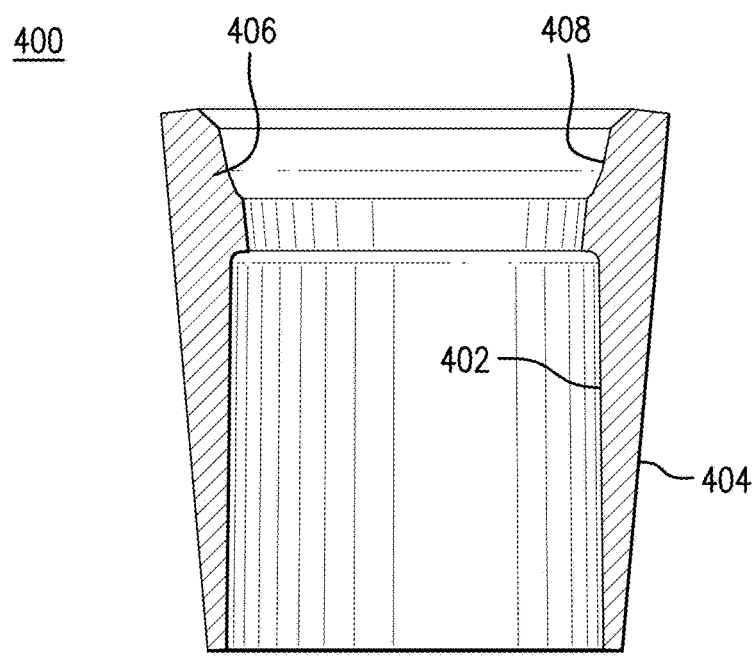

Referring to FIGS. 13A and 13B, a seal 400 includes an inner sealing surface 402, outer sealing surface 404, seat 406, and a surface 408 of the seat 406. The surface 408 is configured (e.g., shaped) to accept a member (e.g., a plug) to provide force on the seal 400 in order to deform the seal so that the inner sealing surface 402 and outer sealing surface 404 respectively form metal-to-metal seals with mating surfaces (not shown in FIGS. 13A and 13B). Alternatively, a compressive force is applied to the seal 400 by a frustoconical member and setting tool disposed at opposing ends of the seal 400 as in FIG. 9A. In an embodiment, the seal 400 is useful in a downhole environment as a conformable, deformable, highly ductile, and disintegrable seal. In an embodiment, the seal 400 is a bridge plug, gasket, flapper valve, and the like.

In addition to being selectively corrodible, the seal herein deforms in situ to conform to a space in which it is disposed in response to an applied setting pressure, which is a pressure large enough to expand radially the seal or to decrease the wall thickness of the seal by increasing the length of the seal. Unlike many seals, e.g., an elastomer seal, the seal herein is prepared in a shape that corresponds to a mating surface to be sealed, e.g., a casing, or frustoconical shape of a downhole tool. In an embodiment, the seal is a temporary seal and has an initial shape that can be run downhole and subsequently deformed under pressure to form a metal-to-metal seal that deforms to surfaces that the seal contacts and fills spaces (e.g. voids) in a mating surface. To achieve the sealing properties, the seal has a percent elongation of about 10% to about 75%, specifically about 15% to about 50%, and more specifically about 15% to about 25%, based on the original size of the seal. The seal has a yield strength of about 15 kilopounds per square inch (ksi) to about 50 ksi, and specifically about 15 ksi to about 45 ksi. The compressive strength of the seal is from about 30 ksi to about 100 ksi, and specifically about 40 ksi to about 80 ksi. To deform the seal, a pressure of up to about 10,000 psi, and specifically about 9,000 psi can be applied to the seal.

Unlike elastomeric seals, the seal herein that includes the metal composite has a temperature rating up to about 1200° F., specifically up to about 1000° F., and more specifically up to about 800° F. The seal is temporary in that the seal is selectively and tailorably disintegrable in response to contact with a downhole fluid or change in condition (e.g., pH, temperature, pressure, time, and the like). Exemplary downhole fluids include brine, mineral acid, organic acid, or a combination comprising at least one of the foregoing.

Since the seal interworks with other components, e.g., a frustoconical member, sleeve, or bottom sub in, e.g., the disintegrable tubular anchoring system herein, the properties of each component are selected for the appropriate relative selectively tailorable material and chemical properties. These properties are a characteristic of the metal composite and the processing conditions that form the metal composite, which is used to produce such articles, i.e., the components. Therefore, in an embodiment, the metal composite of a component will differ from that of another component of the disintegrable system. In this way, the components have independent selectively tailorable mechanical and chemical properties.

According to an embodiment, the sleeve and seal deform under a force imparted by the frustoconical member and bottom sub. To achieve this result, the sleeve and seal have a compressive strength that is less than that of the bottom sub or frustoconical member. In another embodiment, the sleeve deforms before, after, or simultaneously as deformation of the seal. It is contemplated that the bottom sub or frustoconical member deforms in certain embodiments. In an embodiment, a component has a different amount of a strengthening agent than another component, for example, where a higher strength component has a greater amount of strengthening agent than does a component of lesser strength. In a specific embodiment, the frustoconical member has a greater amount of strengthening agent than that of the seal. In another embodiment, the frustoconical member has a greater amount of strengthening agent than that of the sleeve. Similarly, the bottom sub can have a greater amount of strengthening agent than either the seal or sleeve. In a particular embodiment, the frustoconical member has a compressive strength that is greater than that of either the seal or sleeve. In a further embodiment, the frustoconical member has a compressive strength that is greater than that of either of the seal or sleeve. In one embodiment, the frustoconical member has a compressive strength of 40 ksi to 100 ksi, specifically 50 ksi to 100 ksi. In another embodiment, the bottom sub has a compressive strength of 40 ksi to 100 ksi, specifically 50 ksi to 100 ksi. In yet another embodiment, the seal has a compressive strength of 30 ksi to 70 ksi, specifically 30 ksi to 60 ksi. In yet another embodiment, the sleeve has a compressive strength of 30 ksi to 80 ksi, specifically 30 ksi to 70 ksi. Thus, under a compressive force either the seal or sleeve will deform before deformation of either the bottom sub or frustoconical member.

Other factors that can affect the relative strength of the components include the type and size of the strengthening agent in each component. In an embodiment, the frustoconical member includes a strengthening of smaller size than a strengthening agent in either of the seal or sleeve. In yet another embodiment, the bottom sub includes a strengthening agent of smaller size than a strengthening agent in either of the seal or sleeve. In one embodiment, the frustoconical member includes a strengthening agent such as a ceramic, metal, cermet, or a combination thereof, wherein the size of the strengthening agent is from 10 nm to 200 µm, specifically 100 nm to 100 µm.

Yet another factor that impacts the relative selectively tailorable material and chemical properties of the components is the constituents of the metal composite, i.e., the metallic nanomatrix of the cellular nanomatrix, the metal matrix disposed in the cellular nanomatrix, or the disintegration agent. The compressive and tensile strengths and disintegration rate are determined by the chemical identity and relative amount of these constituents. Thus, these properties can be regulated by the constituents of the metal composite. According to an embodiment, a component (e.g., seal, frustoconical member, sleeve, or bottom sub) has a metal matrix of the metal composite that includes a pure metal, and another component has a metal matrix that includes an alloy. In another embodiment, the seal has a metal matrix that includes a pure metal, and the frustoconical member has a metal matrix that includes an alloy. In an additional embodiment, the sleeve has a metal matrix that is a pure metal. It is contemplated that a component can be functionally graded in that the metal matrix of the metal composite can contain both a pure metal and an alloy having a gradient in the relative amount of either the pure metal or alloy in the metal matrix as disposed in the component. Therefore, the value of the selectively tailorable properties varies in relation to the position along the component.

In a particular embodiment, the disintegration rate of a component (e.g., seal, frustoconical member, sleeve, or bottom sub) has a greater value than that of another component. Alternatively, each component can have substantially the same disintegration rate. In a further embodiment, the sleeve has a greater disintegration rate than another component, e.g., the frustoconical member. In another embodiment, the amount of disintegration agent of a component (e.g., seal, frustoconical member, sleeve, or bottom sub) is present in an amount greater than that of another component. In another embodiment, the amount of disintegration agent present in the sleeve is greater than another component. In one embodiment, the amount of disintegrating agent in the seal is greater than another component.

Figure 14:
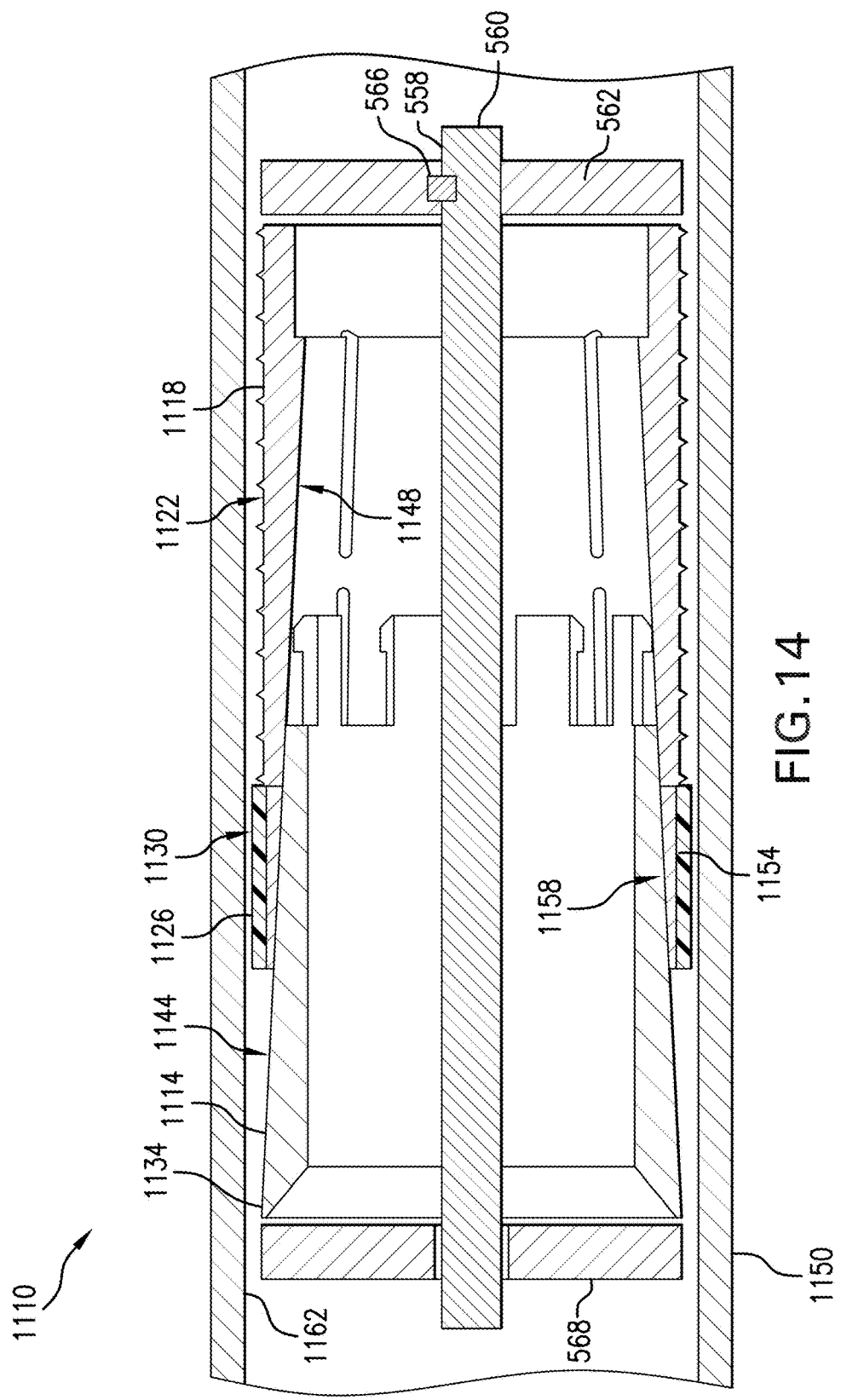
FIG. 14 depicts a cross sectional view of another embodiment of a disintegrable tubular anchoring system.
Figure 15:
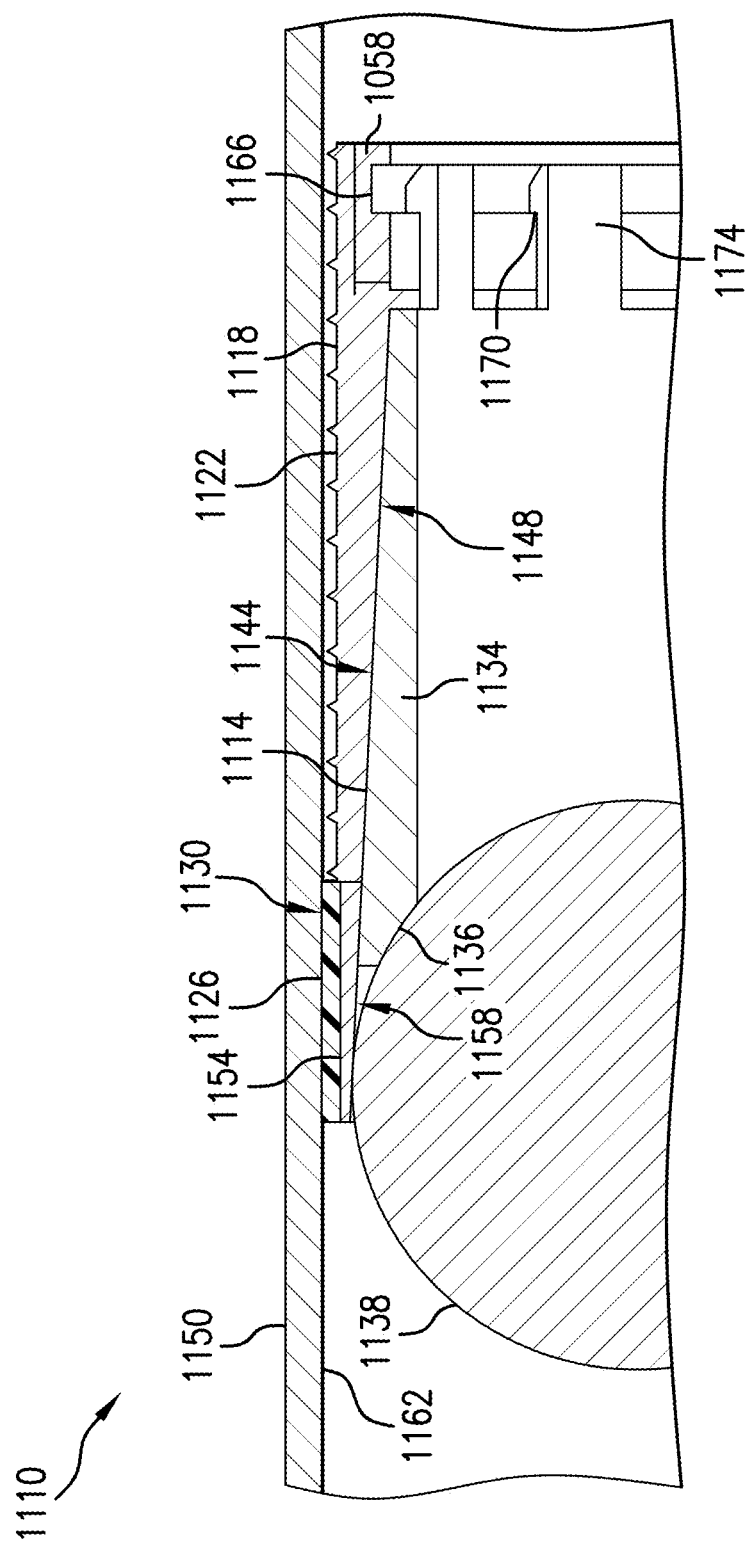
FIG. 15 depicts a cross sectional view of the disintegrable tubular anchoring system of FIG. 14 in a set position.

Referring to FIGS. 14 and 15, an alternate embodiment of a disintegrable tubular anchoring system is illustrated at 1110. The disintegrable system 1110 includes a frustoconical member 1114, a sleeve 1118 having a surface 1122, a seal 1126 having a surface 1130, and a seat 1134, wherein each component is made of the metal composite and has selectively tailorable mechanical and chemical properties herein. A primary difference between the system 510 (FIG. 9) and the system 1110 is the initial relative position of the seal and frustoconical member.

An amount of radial alteration that the surface 1122 of the sleeve 1118 undergoes is controlled by how far the frustoconical member 1114 is forced into the sleeve 1118. A frustoconical surface 1144 on the frustoconical member 1114 is wedgably engagable with a frustoconical surface 1148 on the sleeve 1118. As such, the further the frustoconical member 1114 is moved relative to the sleeve 1118, the greater the radial alteration of the sleeve 1118. Similarly, the seal 1126 is positioned radially of the frustoconical surface 1144 and is longitudinally fixed relative to the sleeve 1118 so the further the frustoconical member 1114 moves relative to the sleeve 1118 and the seal 1126, the greater the radial alteration of the seal 1126 and the surface 1130. The foregoing structure allows an operator to determine the amount of radial alteration of the surfaces 1122, 1130 after the system 1110 is positioned within a structure 1150.

Optionally, the system 1110 can include a collar 1154 positioned radially between the seal 1126 and the frustoconical member 1114 such that a radial dimension of the collar 1154 is also altered by the frustoconical member 1114 in response to the movement relative thereto. The collar 1154 can have a frustoconical surface 1158 complementary to the frustoconical surface 1144 such that substantially the full longitudinal extent of the collar 1154 is simultaneously radially altered upon movement of the frustoconical member 1114. The collar 1154 may be made of a metal composite that is different than that of the seal 1126 or that of the frustoconical member 1114. Thus, collar 1154 can maintain the seal 1126 at an altered radial dimension even if the frustoconical surface 1144 is later moved out of engagement with the frustoconical surface 1158, thereby maintaining the seal 1126 in sealing engagement with a wall 1162 of the structure 1150. This can be achieved by selecting the metal composite of the collar 1154 to have a higher compressive strength than that of the seal 1126.

The disintegrable system 1110 further includes a land 1136 on the frustoconical member 1114 sealably engagable with the plug 1138. Also included in the disintegrable system are a recess 1166 (within a wall 1058) of the sleeve 1118 receptive to shoulders 1170 on fingers 1174, which provisions are engagable together once the setting tool 558 compresses the disintegrable system 1110 in a similar manner as the disintegrable system 510 is settable with the setting tool 558 as shown in FIG. 9.

Figure 16:
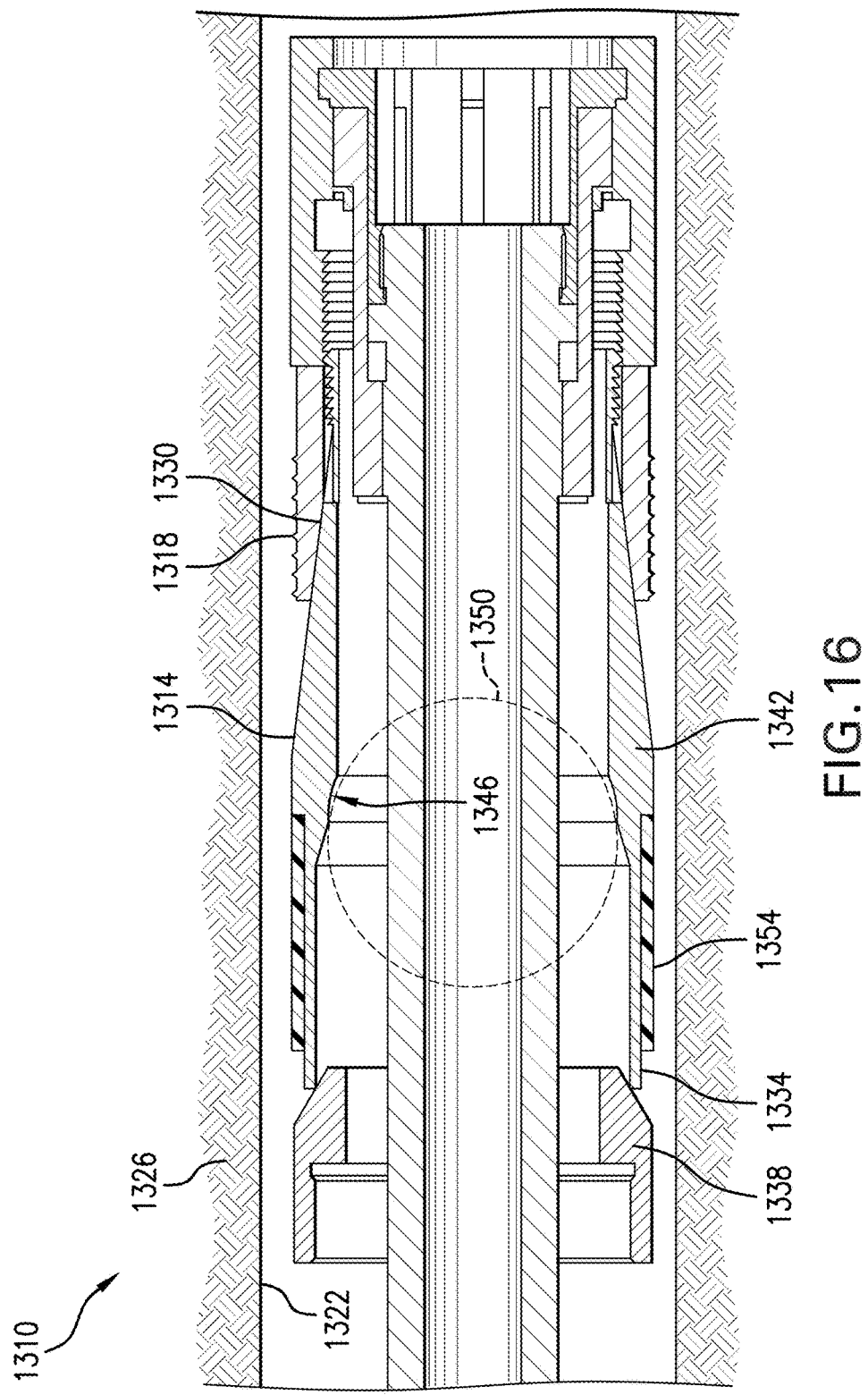
FIG. 16 depicts a cross sectional view of another embodiment of a disintegrable tubular anchoring system.

Referring to FIG. 16, another alternate embodiment of a disintegrable tubular anchoring system is illustrated at 1310. The disintegrable system 1310 includes a first frustoconical member 1314, sleeve 1318 positioned and configured to be radially expanded into anchoring engagement with a structure 1322, illustrated herein as a wellbore in an earth formation 1326, in response to being urged against a frustoconical surface 1330 of the first frustoconical member 1314. A collar 1334 is radially expandable into sealing engagement with the structure 1322 in response to being urged longitudinally relative to a second frustoconical member 1338 and has a seat 1342 with a surface 1346 sealingly receptive to a plug 1350 (shown with dashed lines) runnable thereagainst. The seat 1342 is displaced in a downstream direction (rightward in FIG. 16) from the collar 1334 as defined by fluid that urges the plug 1350 against the seat 1342. This configuration and position of the surface 1346 relative to the collar 1334 aids in maintaining the collar 1334 in a radially expanded configuration (after having been expanded) by minimizing radial forces on the collar 1334 due to pressure differential across the seat 1342 when plugged by a plug 1350.

To clarify, if the surface 1346 were positioned in a direction upstream of even a portion of the longitudinal extend of the collar 1334 (which it is not) then pressure built across the plug 1350 seated against the surface 1346 would generate a pressure differential radially across the portion of the collar 1334 positioned in a direction downstream of the surface 1346. This pressure differential would be defined by a greater pressure radially outwardly of the collar 1334 than radially inwardly of the collar 1334, thereby creating radially inwardly forces on the collar 1334. These radially inwardly forces, if large enough, could cause the collar 1334 to deform radially inwardly potentially compromising the sealing integrity between the collar 1334 and the structure 1322 in the process. This condition is specifically avoided by the positioning of the surface 1346 relative to the collar 1334.

Optionally, the disintegrable tubular anchoring system 1310 includes a seal 1354 positioned radially of the collar 1334 configured to facilitate sealing of the collar 1334 to the structure 1322 by being compressed radially therebetween when the collar 1334 is radially expanded. The seal 1354 is fabricated from a metal composite that has a lower compressive strength than that of the first frustoconical member 1314 to enhance sealing of the seal 1354 to both the collar 1334 and the structure 1322. In an embodiment, the seal 1354 has a lower compressive strength than that of the collar 1334.

Thus in this embodiment, the disintegrable system 1310 can include a first frustoconical member 1314, sleeve 1318, and an optional seal 1354. In the instance when the seal 1354 is not present, the collar 1334 of the first frustoconical member 1314 can form a metal-to-metal seal with the casing or liner or conform to an openhole surface. In some embodiments, the first frustoconical member 1314 contains a functionally graded metal composite such that the collar 1334 has a lower compressive strength value than that of the rest of the first frustoconical member 1314. In another embodiment the collar 1334 has a lower compressive strength than that of the second frustoconical member 1338. In yet another embodiment, the second frustoconical member 1338 has a greater compressive strength than that of the seal 1354.

Figure 17:
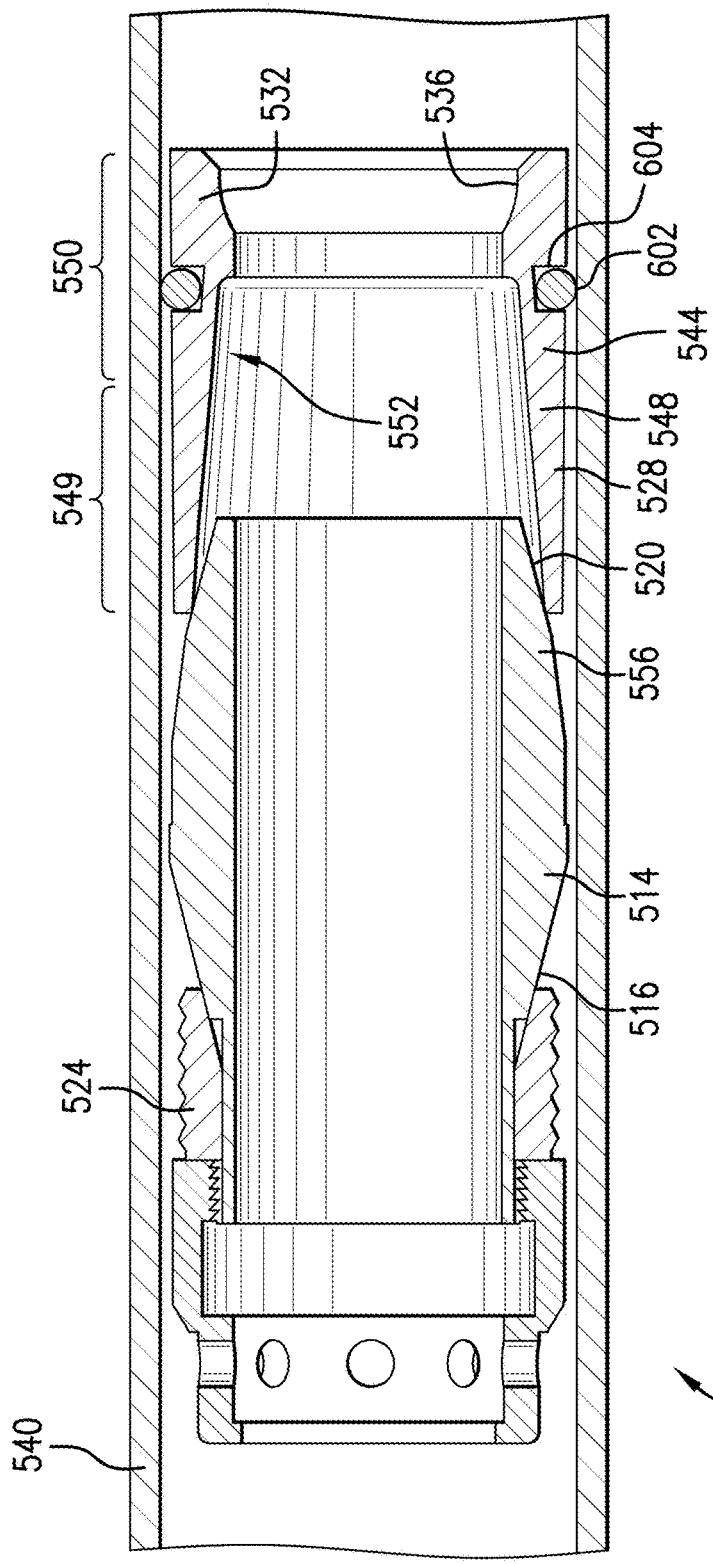
FIG. 17 depicts a cross sectional view of another embodiment of a disintegrable seal with an elastomer backup ring in a disintegrable tubular anchoring system.

The components herein can be augmented with various materials. In one embodiment, a seal, e.g., seal 528, can include a backup seal such as an elastomer material 602 as shown in FIG. 17. The elastomer can be, for example, an O-ring disposed in a gland 604 on the surface of the seal 528. The elastomer material includes but not limited to, for example, butadiene rubber (BR), butyl rubber (IIR), chlorosulfonated polyethylene (CSM), epichlorohydrin rubber (ECH, ECO), ethylene propylene diene monomer (EPDM), ethylene propylene rubber (EPR), fluoroelastomer (FKM), nitrile rubber (NBR, HNBR, HSN), perfluoroelastomer (FFKM), polyacrylate rubber (ACM), polychloroprene (neoprene) (CR), polyisoprene (IR), polysulfide rubber (PSR), sanifluor, silicone rubber (SiR), styrene butadiene rubber (SBR), or a combination comprising at least one of the foregoing.

As described herein, the components, e.g., the seal, can be used in a downhole environment, for example, to provide a metal-to-metal seal. In an embodiment, a method for temporarily sealing a downhole element includes disposing a component downhole and applying pressure to deform the component. The component can include a seal, frustoconical member, sleeve, bottom, or a combination comprising at least one of the foregoing. The method also includes conforming the seal to a space to form a temporary seal, compressing the sleeve to engage a surface, and thereafter contacting the component with a downhole fluid to disintegrate the component. The component includes the metal composite herein having a metal matrix, disintegration agent, cellular nanomatrix, and optionally strengthening agent. The metal composite of the seal forms an inner sealing surface and an outer sealing surface disposed radially from the inner sealing surface of the seal.

According to an embodiment, a process of isolating a structure includes disposing a disintegrable tubular anchoring system herein in a structure (e.g., tubular, pipe, tube, borehole (closed or open), and the like), radially altering the sleeve to engage a surface of the structure, and radially altering the seal to the isolate the structure. The disintegrable tubular anchoring system can be contacted with a fluid to disintegrate, e.g., the seal, frustoconical member, sleeve, bottom sub or a combination of at least one of the foregoing. The process further can include setting the disintegrable anchoring system with a setting tool. Additionally, a plug can be disposed on the seal. Isolating the structure can be completely or substantially impeding fluid flow through the structure.

Figure 18A:
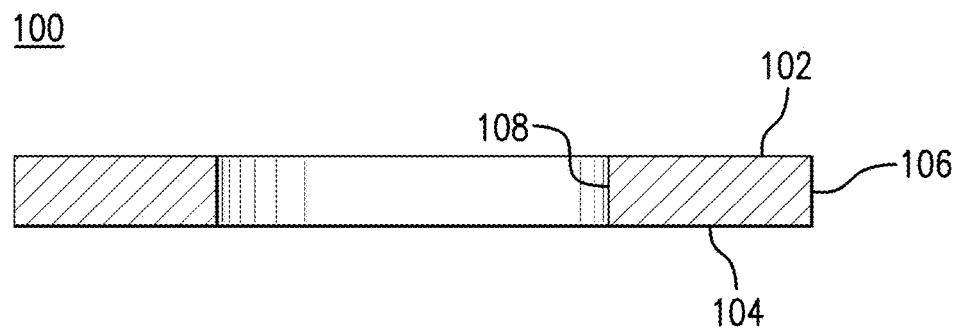
FIGS. 18A and 18B respectively depict a cross sectional and perspective views of another embodiment of a disintegrable seal.
Figure 18B:
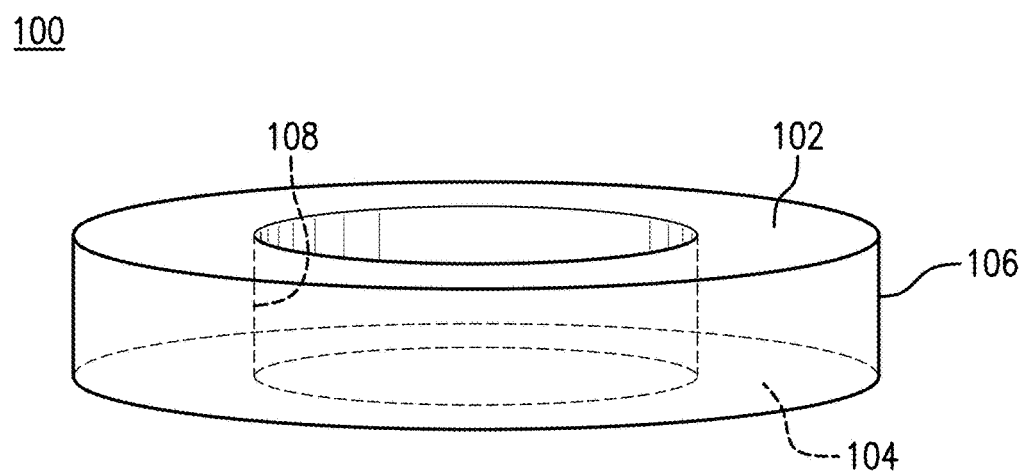

Moreover, the seal can have various shapes and sealing surfaces besides the particular arrangement shown in FIGS. 9 and 13-16. In another embodiment, Referring to FIGS. 18A and 18B, an embodiment of a seal disclosed herein is illustrated at 100. The seal 100 includes a metal composite, a first sealing surface 102, and a second sealing surface 104 opposingly disposed from the first sealing surface 102. The metal composite includes a metal matrix disposed in a cellular nanomatrix, a disintegration agent, and optionally a strengthening agent. The seal 100 can be any shape and conforms in situ under pressure to a surface to form a temporary seal that is selectively disintegrable in response to contact with a fluid. In this embodiment, the seal 100 is an annular shape with an outer diameter 106 and inner diameter 108. In some embodiments, the first surface 102, second surface 104, outer diameter 106, inner diameter 108, or a combination comprising at least one of the foregoing can be a sealing surface.

Although variations of a disintegrable tubular anchoring system have described that include several components together, it is contemplated that each component is separately and independently applicable as an article. Further, any combination of the components can be used together. Moreover, the components can be used in surface or downhole environments.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A seal comprising:
   a metal composite including:
      a cellular nanomatrix comprising a metallic nanomatrix material;
      a metal matrix disposed in the cellular nanomatrix; and
      a disintegration agent;
   a first sealing surface; and
   a second sealing surface opposingly disposed from the first sealing surface, wherein the seal further comprises a gland in the second sealing surface.

2. The seal of claim 1, wherein the first sealing surface is disposed on the interior of the seal, and the second sealing surface is radially disposed from the first sealing surface on the exterior of the seal.

3. The seal of claim 1, wherein the disintegration agent is further disposed in the cellular nanomatrix external to the metal matrix.

4. The seal of claim 1, wherein the metal matrix comprises aluminum, iron, magnesium, manganese, zinc, or a combination comprising at least one of the foregoing.

5. The seal of claim 1, wherein the disintegration agent comprises cobalt, copper, iron, nickel, tungsten, zinc, or a combination comprising at least one of the foregoing.

6. The seal of claim 1, wherein the metallic nanomatrix material comprises aluminum, cobalt, copper, iron, magnesium, nickel, silicon, tungsten, zinc, an oxide thereof, a nitride thereof, a carbide thereof, an intermetallic compound thereof, a cermet thereof, or a combination comprising at least one of the foregoing.

7. The seal of claim 1, wherein the amount of the metal matrix is about 50 wt % to about 95 wt %, based on the weight of the seal.

8. The seal of claim 1, wherein the amount of the disintegration agent is about 0.25 wt % to about 15 wt %, based on the weight of the seal.

9. The seal of claim 1, wherein the amount of the metal nanomatrix material is about 10 wt % to about 50 wt %, based on the weight of the seal.

10. The seal of claim 1, further comprising an additive particle which includes a metal, carbon, metal oxide, metal nitride, metal carbide, intermetallic compound, cermet, or a combination comprising at least one of the foregoing.

11. The seal of claim 10, wherein the amount additive particle is about 0.5 wt % to about 25 wt %, based on the weight of the seal.

12. The seal of claim 1, further comprising an elastomer disposed in the gland.

13. The seal of claim 12, wherein the elastomer includes butadiene rubber, butyl rubber, chlorosulfonated polyethylene, epichlorohydrin rubber, ethylene propylene diene monomer, ethylene propylene rubber, fluoroelastomer, nitrile rubber, perfluoroelastomer, polyacrylate rubber, polychloroprene, polyisoprene, polysulfide rubber, sanifluor, silicone rubber, styrene butadiene rubber, or a combination comprising at least one of the foregoing.

14. The seal of claim 1, wherein the seal is a temporary seal is a temporary seal.

15. The seal of claim 1, wherein the seal has a percent elongation of about 10% to about 75%, based on the original size of the seal.

16. The seal of claim 1, wherein the seal has a yield strength of about 15 ksi to about 50 ksi.

17. The seal of claim 1, wherein the seal has a compressive strength of about 30 ksi to about 80 ksi.

18. The seal of claim 1, wherein the seal has a temperature rating of up to 1000° F.

19. The seal of claim 1, wherein the seal is disintegrable in response to contact with a fluid.

20. The seal of claim 19, wherein the fluid comprises brine, mineral acid, organic acid, or a combination comprising at least one of the foregoing.

21. An article comprising the seal of claim 1, wherein the article is a frac plug, bridge plug, a gasket, or a flapper valve.

22. The article of claim 21, wherein the seal is configured to form a metal-to-metal seal in response to application of a compressive force.

23. The seal of claim 1, wherein the amount of the metal matrix is about 50 wt % to about 95 wt %, the amount of the disintegration agent is about 0.25 wt % to about 15 wt %, and the amount of the metal nanomatrix material is about 10 wt % to about 50 wt %, each based on the weight of the seal.

24. The seal of claim 1, wherein the metal matrix comprising magnesium, manganese, zinc, or a combination comprising at least one of the foregoing.

25. The seal of claim 1, wherein the metal matrix comprising magnesium metal or a magnesium alloy.

26. The seal of claim 1, wherein the metal matrix comprises a particle core material that is discontinuously and discretely distributed as particles within the metal composite.

27. The seal of claim 26, wherein the particle core material includes a nanostructures material.

28. The seal of claim 1, wherein the cellular nanomatrix is substantially continuous.

29. The seal of claim 28, wherein the metal composite comprises deformed powder particles formed by compacting powder particles comprising a particle core and at least one coating layer, the coating layers joined by solid-state bonding to form the substantially continuous cellular nanomatrix and leave the particle cores as the dispersed particles.

30. A method for temporarily sealing an element, the method comprising:
   applying pressure to deform a seal of claim 1;
   conforming the seal to a space to form a temporary seal; and
   contacting the temporary seal with a fluid to disintegrate the temporary seal.

31. The method of claim 30, wherein the temporary seal is a metal-to-metal seal.

32. The method of claim 30, wherein the first sealing surface is an inner sealing surface, and the second sealing surface is an outer sealing surface disposed radially from the inner sealing surface.

* * * * *